United States Patent
Newman et al.

(10) Patent No.: US 10,820,349 B2
(45) Date of Patent: Oct. 27, 2020

(54) WIRELESS MESSAGE COLLISION AVOIDANCE WITH HIGH THROUGHPUT

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(73) Assignee: AUTONOMOUS ROADWAY INTELLIGENCE, LLC, Palos Verdes, CA (US)

(*) Notice: Subject to any disclaimer, the term of this patent is extended or adjusted under 35 U.S.C. 154(b) by 3 days.

(21) Appl. No.: 16/698,011

(22) Filed: Nov. 27, 2019

(65) Prior Publication Data

US 2020/0205199 A1 Jun. 25, 2020

Related U.S. Application Data

(60) Provisional application No. 62/782,672, filed on Dec. 20, 2018, provisional application No. 62/832,499, filed on Apr. 11, 2019, provisional application No. 62/843,867, filed on May 6, 2019, provisional application No. 62/861,055, filed on Jun. 13, 2019, provisional application No. 62/924,914, filed on Oct. 23, 2019.

(51) Int. Cl.
*H04W 74/02* (2009.01)
*H04W 74/08* (2009.01)
*H04L 1/18* (2006.01)

(52) U.S. Cl.
CPC ....... *H04W 74/0816* (2013.01); *H04L 1/1812* (2013.01)

(58) Field of Classification Search
CPC ...... H04W 72/04; H04W 88/08; H04W 76/00
See application file for complete search history.

(56) References Cited

U.S. PATENT DOCUMENTS

| | | |
|---|---|---|
| 3,466,409 A | 9/1969 | Pernet |
| 3,882,449 A | 5/1975 | Bouchard |
| 3,952,381 A | 4/1976 | Barbe |
| 4,381,829 A | 5/1983 | Montaron |
| 4,524,287 A | 6/1985 | Brannen |

(Continued)

FOREIGN PATENT DOCUMENTS

| | | |
|---|---|---|
| DE | 102014212898 | 1/2016 |
| EP | 0136553 A2 | 4/1985 |

(Continued)

OTHER PUBLICATIONS

Ames M. Westall, Csma/Ca, 2016, https://people.cs.clemson.edu/~westall/851/802.11/802_CSMA_CA.pdf.

(Continued)

*Primary Examiner* — Hassan A Phillips
*Assistant Examiner* — Prenell P Jones
(74) *Attorney, Agent, or Firm* — Mayer & Williams, PC

(57) ABSTRACT

Improved protocols for wireless networking are disclosed. At low/zero marginal cost, embodiments enable increased throughput and reduced delays at high traffic density, while greatly reducing message collisions and ensuring that each user is able to transmit in order. By providing a sequencing advantage to nodes that have already been delayed, embodiments can eliminate the "blocked node" problem in which some nodes are suppressed indefinitely while other nodes are allowed to dominate a communication channel with multiple transmissions. As the wireless traffic density soars in the coming years, embodiments can improve system utility while enhancing user satisfaction by providing higher message success rates, reducing user frustration, minimizing message delays and message collisions, and eliminating node blocking. An array of embodiments can be implemented on existing and planned equipment with appropriate programming. And of vital importance in emergencies, the likelihood of a blocked 911 call can be significantly reduced.

30 Claims, 16 Drawing Sheets

(56) References Cited

U.S. PATENT DOCUMENTS

| | | |
|---|---|---|
| 5,894,906 A | 4/1999 | Weber |
| 5,959,552 A | 9/1999 | Cho |
| 5,983,161 A | 11/1999 | Lemelson |
| 6,084,508 A | 7/2000 | Mai |
| 6,225,918 B1 | 5/2001 | Kam |
| 6,269,308 B1 | 7/2001 | Kodaka |
| 6,275,773 B1 | 8/2001 | Lemelson |
| 6,317,692 B2 | 11/2001 | Kodaka |
| 6,359,553 B1 | 3/2002 | Kopischke |
| 6,420,996 B1 | 7/2002 | Stopczynski |
| 6,442,485 B2 | 8/2002 | Evans |
| 6,487,500 B2 | 11/2002 | Lemelson |
| 6,496,764 B1 | 12/2002 | Wang |
| 6,597,974 B2 | 7/2003 | Roelleke |
| 6,678,590 B1 | 1/2004 | Burchfiel |
| 6,791,471 B2 | 9/2004 | Wehner |
| 6,831,572 B2 | 12/2004 | Strumolo |
| 6,996,074 B2 | 2/2006 | Garcia-Luna-Aceves |
| 7,002,947 B1 | 2/2006 | McFarland |
| 7,016,782 B2 | 3/2006 | Schiffmann |
| 7,079,508 B2 | 7/2006 | Ayyagari |
| 7,124,027 B1 | 10/2006 | Ernst |
| 7,177,294 B2 | 2/2007 | Chen |
| 7,375,627 B2 | 5/2008 | Johnson |
| 7,409,295 B2 | 8/2008 | Paradie |
| 7,660,436 B2 | 2/2010 | Chang |
| 7,667,581 B2 | 2/2010 | Fujimoto |
| 7,696,863 B2 | 4/2010 | Lucas |
| 7,797,107 B2 | 9/2010 | Shiller |
| 7,840,354 B2 | 11/2010 | Knoop |
| 7,966,127 B2 | 6/2011 | Ono |
| 7,975,798 B2 | 7/2011 | Lucas |
| 8,108,147 B1 | 1/2012 | Blackburn |
| 8,112,225 B2 | 2/2012 | Eidehall |
| 8,121,545 B2 * | 2/2012 | Stahl ............ H04W 74/08 370/338 |
| 8,238,378 B2 | 8/2012 | Benveniste |
| 8,340,883 B2 | 12/2012 | Arbitmann |
| 8,369,350 B2 | 2/2013 | Koo |
| 8,447,472 B2 | 5/2013 | Joh |
| 8,463,500 B2 | 6/2013 | Cuddihy |
| 8,504,283 B2 | 8/2013 | Aso |
| 8,520,695 B1 | 8/2013 | Rubin |
| 8,527,172 B2 | 9/2013 | Moshchuk |
| 8,538,674 B2 | 9/2013 | Breuer |
| 8,576,055 B2 | 11/2013 | Hara |
| 8,589,061 B2 | 11/2013 | Bengtsson |
| 8,639,437 B2 | 1/2014 | Caminiti |
| 8,849,515 B2 | 9/2014 | Moshchuk |
| 8,874,300 B2 | 10/2014 | Allard |
| 8,907,780 B2 | 12/2014 | Rohr |
| 8,937,893 B1 | 1/2015 | Nemavat |
| 8,948,955 B2 | 2/2015 | Zhu |
| 9,031,743 B2 | 5/2015 | Okita |
| 9,031,761 B2 | 5/2015 | Koshizen |
| 9,031,774 B2 | 5/2015 | Suk |
| 9,037,379 B2 | 5/2015 | Shin |
| 9,050,930 B2 | 6/2015 | Walsh |
| 9,108,582 B1 | 8/2015 | Kozloski |
| 9,110,169 B2 | 8/2015 | Stettner |
| 9,155,027 B1 | 10/2015 | Liu |
| 9,165,469 B2 | 10/2015 | Bowers |
| 9,199,614 B2 | 12/2015 | Ito |
| 9,210,722 B2 | 12/2015 | Batsuuri |
| 9,250,324 B2 | 2/2016 | Zeng |
| 9,318,023 B2 | 4/2016 | Moshchuk |
| 9,378,601 B2 | 6/2016 | Ricci |
| 9,398,594 B2 | 7/2016 | Benveniste |
| 9,415,658 B1 | 8/2016 | Makkar |
| 9,421,400 B2 | 8/2016 | Oakes |
| 9,469,297 B2 | 10/2016 | Akiyama |
| 9,701,307 B1 | 7/2017 | Newman |
| 9,721,400 B1 | 8/2017 | Oakes |
| 9,788,182 B2 | 10/2017 | Lee |
| 9,896,093 B2 | 2/2018 | Vollmer |
| 9,896,096 B2 | 2/2018 | Newman |
| 10,335,962 B1 | 7/2019 | Rosenberg |
| 10,405,340 B2 | 9/2019 | Ma |
| 2002/0037014 A1 | 3/2002 | Myojo |
| 2002/0097694 A1 | 7/2002 | Struhsaker |
| 2002/0198632 A1 | 12/2002 | Breed |
| 2003/0014165 A1 | 1/2003 | Baker |
| 2003/0067219 A1 | 4/2003 | Seto |
| 2003/0080543 A1 | 5/2003 | Takagi |
| 2003/0086437 A1 * | 5/2003 | Benveniste ............ H04L 47/10 370/461 |
| 2003/0114113 A1 | 6/2003 | Komprobst |
| 2003/0193889 A1 | 10/2003 | Jacobsen |
| 2004/0030498 A1 | 2/2004 | Knoop |
| 2004/0100936 A1 | 5/2004 | Liu |
| 2004/0117081 A1 | 6/2004 | Mori |
| 2004/0120292 A1 | 6/2004 | Trainin |
| 2004/0122578 A1 | 6/2004 | Isaji |
| 2004/0193374 A1 | 9/2004 | Hae |
| 2004/0196864 A1 | 10/2004 | Benveniste |
| 2004/0252863 A1 | 12/2004 | Chang |
| 2005/0058151 A1 | 3/2005 | Yeh |
| 2005/0060069 A1 | 3/2005 | Breed |
| 2005/0071071 A1 | 3/2005 | Nagata |
| 2005/0107955 A1 | 5/2005 | Isaji |
| 2005/0114000 A1 | 5/2005 | Cashier |
| 2005/0131646 A1 | 6/2005 | Camus |
| 2005/0206142 A1 | 9/2005 | Prakah-asante |
| 2005/0271076 A1 * | 12/2005 | Ganti ............ H04L 12/413 370/448 |
| 2005/0280520 A1 | 12/2005 | Kubo |
| 2006/0028984 A1 | 2/2006 | Wu |
| 2006/0029073 A1 | 2/2006 | Cervello |
| 2006/0050661 A1 | 3/2006 | Shim |
| 2006/0085131 A1 | 4/2006 | Yopp |
| 2006/0091654 A1 | 5/2006 | De Mersseman |
| 2006/0109094 A1 | 5/2006 | Prakah-Asante |
| 2006/0121877 A1 | 6/2006 | Raghuram |
| 2006/0125616 A1 | 6/2006 | Song |
| 2006/0227802 A1 | 10/2006 | Du |
| 2006/0282218 A1 | 12/2006 | Urai |
| 2007/0066276 A1 | 3/2007 | Kuz |
| 2007/0078600 A1 | 4/2007 | Fregene |
| 2007/0080825 A1 | 4/2007 | Shiller |
| 2007/0112516 A1 | 5/2007 | Taniguchi |
| 2007/0123208 A1 | 5/2007 | Batta |
| 2007/0125588 A1 | 6/2007 | Akgun |
| 2007/0143613 A1 | 6/2007 | Sitch |
| 2007/0159319 A1 | 7/2007 | Maldonado |
| 2007/0182528 A1 | 8/2007 | Breed |
| 2007/0189239 A1 | 8/2007 | Lim |
| 2007/0213029 A1 | 9/2007 | Edney |
| 2007/0219672 A1 | 9/2007 | Fehr |
| 2007/0282530 A1 | 12/2007 | Meister |
| 2008/0090547 A1 | 4/2008 | Struhsaker |
| 2008/0097699 A1 | 4/2008 | Ono |
| 2008/0130528 A1 | 6/2008 | Ennai |
| 2008/0144493 A1 | 6/2008 | Yeh |
| 2008/0208408 A1 | 8/2008 | Arbitmann |
| 2008/0300755 A1 | 12/2008 | Madau |
| 2008/0319610 A1 | 12/2008 | Oechsle |
| 2009/0018740 A1 | 1/2009 | Noda |
| 2009/0066492 A1 | 3/2009 | Kubota |
| 2009/0074249 A1 | 3/2009 | Moed |
| 2009/0076702 A1 | 3/2009 | Arbitmann |
| 2009/0143951 A1 | 6/2009 | JunyaTakahashi |
| 2009/0157247 A1 | 6/2009 | Sjogren |
| 2009/0182465 A1 | 7/2009 | Wilke |
| 2009/0184862 A1 | 7/2009 | Stayton |
| 2009/0192683 A1 | 7/2009 | Kondou |
| 2009/0292468 A1 | 11/2009 | Wu |
| 2009/0299593 A1 | 12/2009 | Borchers |
| 2009/0299857 A1 | 12/2009 | Brubaker |
| 2009/0322500 A1 | 12/2009 | Chatterjee |
| 2009/0326796 A1 | 12/2009 | Prokhorov |
| 2010/0054146 A1 * | 3/2010 | Rudland ............ H04W 72/085 370/252 |
| 2010/0093304 A1 | 4/2010 | Miyoshi |
| 2010/0110888 A1 | 5/2010 | Park |

(56) References Cited

U.S. PATENT DOCUMENTS

| | | |
|---|---|---|
| 2010/0131635 A1 | 5/2010 | Gunduzhan |
| 2010/0150074 A1 | 6/2010 | Yamada |
| 2010/0179760 A1 | 7/2010 | Petrini |
| 2010/0191759 A1 | 7/2010 | Li |
| 2010/0202378 A1 | 8/2010 | Youn |
| 2010/0254365 A1 | 10/2010 | Benveniste |
| 2010/0256852 A1 | 10/2010 | Mudalige |
| 2010/0305857 A1 | 12/2010 | Byrne |
| 2011/0035116 A1 | 2/2011 | Ieda |
| 2011/0059721 A1 | 3/2011 | Chen |
| 2011/0106361 A1 | 5/2011 | Staempfle |
| 2011/0178710 A1 | 7/2011 | Pilutti |
| 2011/0188416 A1 | 8/2011 | Faccin |
| 2011/0210872 A1 | 9/2011 | Molander |
| 2011/0238987 A1 | 9/2011 | Kherani |
| 2011/0295464 A1 | 12/2011 | Zagorski |
| 2011/0307139 A1 | 12/2011 | Caminiti |
| 2012/0015622 A1 | 1/2012 | Kuz |
| 2012/0069746 A1* | 3/2012 | Park .............. H04W 72/082 370/252 |
| 2012/0078472 A1 | 3/2012 | Neal |
| 2012/0082139 A1* | 4/2012 | Kwak ............ H04W 74/0816 370/336 |
| 2012/0083947 A1 | 4/2012 | Anderson |
| 2012/0083960 A1 | 4/2012 | Zhu |
| 2012/0092208 A1 | 4/2012 | Lemire |
| 2012/0101713 A1 | 4/2012 | Moshchuk |
| 2012/0130561 A1 | 5/2012 | Chiang |
| 2012/0130629 A1 | 5/2012 | Kim |
| 2012/0143488 A1 | 6/2012 | Othmezouri |
| 2012/0155397 A1 | 6/2012 | Shaffer |
| 2012/0208488 A1 | 8/2012 | Park |
| 2012/0230205 A1 | 9/2012 | An |
| 2012/0230262 A1 | 9/2012 | Benveniste |
| 2012/0235853 A1 | 9/2012 | Takeuchi |
| 2012/0287849 A1* | 11/2012 | Wilczewski ....... H04W 74/085 370/328 |
| 2012/0289185 A1 | 11/2012 | Leung |
| 2012/0330542 A1 | 12/2012 | Hafner |
| 2013/0030651 A1 | 1/2013 | Moshchuk |
| 2013/0030686 A1 | 1/2013 | Morotomi |
| 2013/0052985 A1 | 2/2013 | Tujkovic |
| 2013/0054128 A1 | 2/2013 | Moshchuk |
| 2013/0111044 A1* | 5/2013 | Cherian ............. H04W 76/00 709/228 |
| 2013/0128786 A1* | 5/2013 | Sultan ............ H04W 52/0238 370/311 |
| 2013/0162479 A1 | 6/2013 | Kelly |
| 2013/0166150 A1 | 6/2013 | Han |
| 2013/0279392 A1 | 10/2013 | Rubin |
| 2013/0279393 A1 | 10/2013 | Rubin |
| 2013/0279491 A1 | 10/2013 | Rubin |
| 2013/0303104 A1 | 11/2013 | Venkatachalam |
| 2013/0336113 A1 | 12/2013 | Okuyama |
| 2014/0016475 A1 | 1/2014 | Zhou |
| 2014/0032049 A1 | 1/2014 | Moshchuk |
| 2014/0039786 A1 | 2/2014 | Schleicher |
| 2014/0049646 A1 | 2/2014 | Nix |
| 2014/0070980 A1 | 3/2014 | Park |
| 2014/0139366 A1 | 5/2014 | Moses |
| 2014/0141742 A1 | 5/2014 | Slow |
| 2014/0142798 A1 | 5/2014 | Guamizo |
| 2014/0156157 A1 | 6/2014 | Johnson |
| 2014/0207344 A1 | 7/2014 | Ihlenburg |
| 2014/0229519 A1 | 8/2014 | Dietrich |
| 2014/0269383 A1 | 9/2014 | He |
| 2014/0273914 A1 | 9/2014 | Mechaley |
| 2014/0379167 A1 | 12/2014 | Flehmig |
| 2015/0003251 A1 | 1/2015 | Shaffer |
| 2015/0046078 A1 | 2/2015 | Biess |
| 2015/0063227 A1 | 3/2015 | Chaponniere |
| 2015/0085119 A1 | 3/2015 | Dagan |
| 2015/0146648 A1 | 5/2015 | Viger |
| 2015/0160338 A1 | 6/2015 | Bageshwar |
| 2015/0166062 A1 | 6/2015 | Johnson |
| 2015/0239413 A1 | 8/2015 | Kozloski |
| 2015/0249515 A1 | 9/2015 | Wu |
| 2015/0262487 A1 | 9/2015 | Cazanas |
| 2015/0264538 A1 | 9/2015 | Klang |
| 2015/0271137 A1 | 9/2015 | Seok |
| 2015/0289164 A1 | 10/2015 | Seok |
| 2015/0307097 A1 | 10/2015 | Steinmeyer |
| 2015/0336574 A1 | 11/2015 | Akiyama |
| 2015/0336579 A1 | 11/2015 | Yoshizawa |
| 2015/0340763 A1 | 11/2015 | Stepanenko |
| 2016/0029197 A1 | 1/2016 | Gellens |
| 2016/0035155 A1 | 2/2016 | Rice |
| 2016/0044693 A1 | 2/2016 | Sun |
| 2016/0050686 A1 | 2/2016 | Krishnamoorthi |
| 2016/0071417 A1 | 3/2016 | Lewis |
| 2016/0103218 A1 | 4/2016 | Mandava |
| 2016/0105784 A1 | 4/2016 | Gellens |
| 2016/0107609 A1 | 4/2016 | Sogabe |
| 2016/0119959 A1 | 4/2016 | Jung |
| 2016/0121887 A1 | 5/2016 | Jeon |
| 2016/0125746 A1 | 5/2016 | Kunzi |
| 2016/0163199 A1 | 6/2016 | Chundrlik |
| 2016/0167671 A1 | 6/2016 | Offenhaeuser |
| 2016/0198493 A1 | 7/2016 | Lin |
| 2016/0200318 A1 | 7/2016 | Parikh |
| 2016/0200319 A1 | 7/2016 | Nemoto |
| 2016/0200320 A1 | 7/2016 | Nemoto |
| 2016/0200321 A1 | 7/2016 | Yamada |
| 2016/0236638 A1 | 8/2016 | Lavie |
| 2016/0239921 A1 | 8/2016 | Bray |
| 2016/0254691 A1 | 9/2016 | Koo |
| 2016/0255530 A1 | 9/2016 | Li |
| 2016/0288799 A1 | 10/2016 | Nguyen Van |
| 2016/0345362 A1 | 11/2016 | Lee |
| 2017/0019933 A1 | 1/2017 | Zhao |
| 2017/0026151 A1* | 1/2017 | Adachi ............ H04W 72/0453 |
| 2017/0043768 A1 | 2/2017 | Prokhorov |
| 2017/0055141 A1 | 2/2017 | Kim |
| 2017/0127259 A1 | 5/2017 | Miner |
| 2017/0148235 A1 | 5/2017 | Yakub |
| 2017/0164371 A1 | 6/2017 | Kim |
| 2017/0236340 A1 | 8/2017 | Hagan, Jr. |
| 2017/0325214 A1 | 11/2017 | Lu |
| 2017/0330457 A1 | 11/2017 | Bhalia |
| 2017/0337813 A1 | 11/2017 | Taylor |
| 2017/0353226 A1 | 12/2017 | Homchaudhuri |
| 2018/0054841 A1 | 2/2018 | Li |
| 2018/0076992 A1* | 3/2018 | Nabetani ................ H04L 1/18 |
| 2018/0084587 A1 | 3/2018 | Noor |
| 2018/0113476 A1 | 4/2018 | Giles |
| 2018/0146359 A1 | 5/2018 | Pawar |
| 2019/0008345 A1 | 1/2019 | Schmidt |
| 2019/0025842 A1 | 1/2019 | Kim |
| 2019/0141507 A1 | 5/2019 | Wang |
| 2019/0150198 A1* | 5/2019 | Sun ................ H04L 5/0032 370/329 |
| 2019/0158257 A1 | 5/2019 | Sano |
| 2019/0159284 A1 | 5/2019 | Noor |
| 2019/0166244 A1 | 5/2019 | Ravichandran |
| 2019/0188997 A1 | 6/2019 | Gilson |
| 2019/0239040 A1 | 8/2019 | Va |
| 2020/0120470 A1 | 4/2020 | Arshad |
| 2020/0205199 A1 | 6/2020 | Newman |

FOREIGN PATENT DOCUMENTS

| | | |
|---|---|---|
| WO | 2006106459 | 10/2006 |
| WO | 2015070087 | 5/2015 |

OTHER PUBLICATIONS

"Automatic Post-Collision Braking System", Volkswagon, Retrieved from: http://www.volkswagen.co.uk/technology/braking-and-stability-systems/automatic-post-collision-braking-system Retrieved on: Oct. 31, 2016 (3 pages total).

(56) References Cited

OTHER PUBLICATIONS

"Emergency", OnStar, Retrieved from: https://www.onstar.com/us/en/services/emergency.html Retrieved on: Nov. 9, 2016 (4 pages total).
Emison, J. Kent, "Post-collision fuel-fed fires.", Apr. 1, 2995, The Free Library, Retrieved Nov. 9, 2016, Retrieved from: https://www.thefreelibrary.com/Post-collision+fuel-fed+fires.-a016859548 (5 pages).
Rodrigo Garces, Collision Avoidance and Resolution Multiple Access for Multichannel Wireless Networks, 1997, https://www.researchgate.net/profile/Jj_Garcia-Luna-Aceves/publication/226494020_Collision_avoidance_and_resolution_multiple_access_CARMA/links/02e7e5334f4dc13f6b000000/Collision-avoidance-and-resolution-multiple-access-CARMA.pdf.
Wei Ye, An Energy-Efficient MAC Protocol for Wireless Sensor Networks, 2002, https://www.isi.edy/~johnh/PAPERS/Ye02a.pdf.
Jung Il Choi, Granting Silence to Avoid Wireless Collisions, 2010, https://sing.stanford,edu/pubs/icnp10-gts.pdf.
James M. Westall, Csma/Ca, 2016, https://people.cs.clemson.edu/~westall/851/802.11/802_CSMA_CA.pdf.

\* cited by examiner

WIRELESS MESSAGE COLLISION AVOIDANCE WITH HIGH THROUGHPUT

PRIORITY CLAIMS AND RELATED APPLICATIONS

This application claims the benefit of U.S. Provisional Patent Application No. 62/782,672, entitled "Infrared Pulse for Autonomous Vehicle Identification", filed Dec. 20, 2018, and U.S. Provisional Patent Application No. 62/832,499, entitled "Autonomous Vehicle Localization System", filed Apr. 11, 2019, and U.S. Provisional Patent Application Ser. No. 62/843,867, entitled "Identification and Localization of Mobile Robots", filed May 6, 2019, and U.S. Provisional Patent Application No. 62/861,055, entitled "Rapid Wireless Communication for Vehicle Collision Mitigation", filed Jun. 13, 2019, and U.S. Provisional Patent Application No. 62/924,914, entitled "Wireless Protocol for Improved Throughput and Fairness", filed Oct. 23, 2019, all of which are hereby incorporated by reference in their entireties. This application is also related to U.S. Pat. No. 9,896,096, issued Feb. 20, 2018, entitled "Systems and Methods for Hazard Mitigation" and U.S. patent application Ser. No. 16/148,390, filed Oct. 1, 2018, entitled "Blind Spot Potential-Hazard Avoidance System", and U.S. patent application Ser. No. 16/503,020, filed Jul. 3, 2019, entitled "Rapid Wireless Communication for Vehicle Collision Mitigation", and U.S. patent application Ser. No. 16/422,498, filed Oct. 17, 2019, entitled "Identification and Localization of Mobile Robots", the contents of which are incorporated herein by reference in their entireties.

FIELD OF THE INVENTION

The invention relates to systems and methods for scheduling wireless messages, and more particularly for managing wireless communication to obtain higher throughput, faster access, improved fairness, fewer message collisions, and reduced congestion.

BACKGROUND OF THE INVENTION

Many devices can communicate wirelessly. In the coming years, the number of wireless communication devices is expected to increase substantially. For example, sensors and actuators and other devices in the IoT (internet of things), vehicles including autonomous vehicles, cellular phones, wireless-enabled computers, and many other devices currently compete, and will continue to compete, for a limited number of communication channels. Emergent technologies such as 5G (fifth generation) wireless networking technology and subsequent generations (such as 6G and following technologies) are expected to enable many more applications, further driving congestion in the limited bandwidth available.

Message collisions and throughput delays become increasingly problematic as the wireless traffic density increases. When two wireless messages transmit on the same frequency channel at the same time, they interfere or "collide" with each other, rendering both messages unintelligible. Both of the colliding messages are usually re-transmitted after a variable delay time, which is intended to reduce the probability that the re-transmitted messages would again collide. To avoid congestion at high message rates, current practice calls for each transmitting node to wait for a waiting time plus a random interval after each failed transmission attempt, and that the waiting time is then increased (typically doubling) after each collision. Due to the increased delays required of nodes that have already been delayed, individual nodes can be entirely blocked, or prevented from transmitting at all for extended periods, while adjacent nodes are allowed to transmit multiple messages at will. Such delays and unequal access become exponentially worse at heavy wireless traffic densities, leading to customer frustration and anger, and most seriously of all, to life-threatening failure of vital services such as emergency 911 calls that are unable to access the communication channel when blocked by congestion. In vehicle applications, blocked access can lead to a life-threatening accident or delayed emergency response. Hence the demand for a vastly improved protocol that allocates access uniformly while handling high loads efficiently.

What is needed is means for improving access, reducing congestion, reducing the number of redundant transmission attempts, and improving the fairness and equality in wireless message scheduling, and eliminating the blocked-node problem so that all nodes may transmit in turn.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, a system for wireless communication comprises a transmitter configured to transmit wireless messages, a receiver configured to receive wireless messages, a processor operably connected to the transmitter and the receiver, and non-transient computer-readable media operably connected to the processor, containing instructions for causing the processor to perform a method. The method comprises transmitting a wireless message while no interfering signals are detected, then if a confirmatory reply is not received within a predetermined interval, waiting a time period equal to the sum of a predetermined initial waiting interval plus a randomly selected delay within a predetermined initial contention window, and then re-transmitting the wireless message, then if a confirmatory reply to the re-transmitted message is not received within a predetermined interval, waiting a predetermined second waiting interval plus a randomly selected delay within a predetermined second contention window (wherein the second waiting interval is shorter than the initial waiting interval, or the second contention window is shorter than the initial contention window), and then transmitting the wireless message.

In a second aspect, a method for wireless communication comprises transmitting a first wireless message, then determining that the first wireless message was not successfully received, then waiting a first backoff delay comprising an initial waiting interval plus a randomly selected portion of an initial contention window, then transmitting a second wireless message, then determining that the second wireless message was not successfully received, then waiting a second backoff delay comprising a second waiting interval plus a randomly selected portion of a second contention window (wherein the second waiting interval is shorter than the first waiting interval or the second contention window is shorter than the second contention window), and then transmitting a third wireless message.

In a third aspect, a local area network comprises a plurality of nodes, each node comprising a processor, a transmitter, and a receiver, and a base station comprising a processor, a transmitter, and a receiver, wherein each node is configured to transmit an RTS message to the base station, the base station is configured to transmit a CTS message responsive to the RTS message, each node is configured to transmit a DAT message responsive to the CTS message, the base station is configured to transmit an ACK message responsive to the DAT message, each node is configured to wait, after transmitting an RTS message and failing to receive a CTS message during a predetermined interval, an initial waiting interval plus a randomly selected portion of an initial contention window, and then to re-transmit the RTS message a second time, each node is configured to wait, after failing to receive a CTS message during a predetermined interval following the second transmitted RTS message, a second waiting interval plus a randomly selected portion of a second contention window, and then to transmit the RTS message a third time, wherein the second waiting interval is shorter than the initial waiting interval, or the second contention window is shorter than the initial contention window.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1:
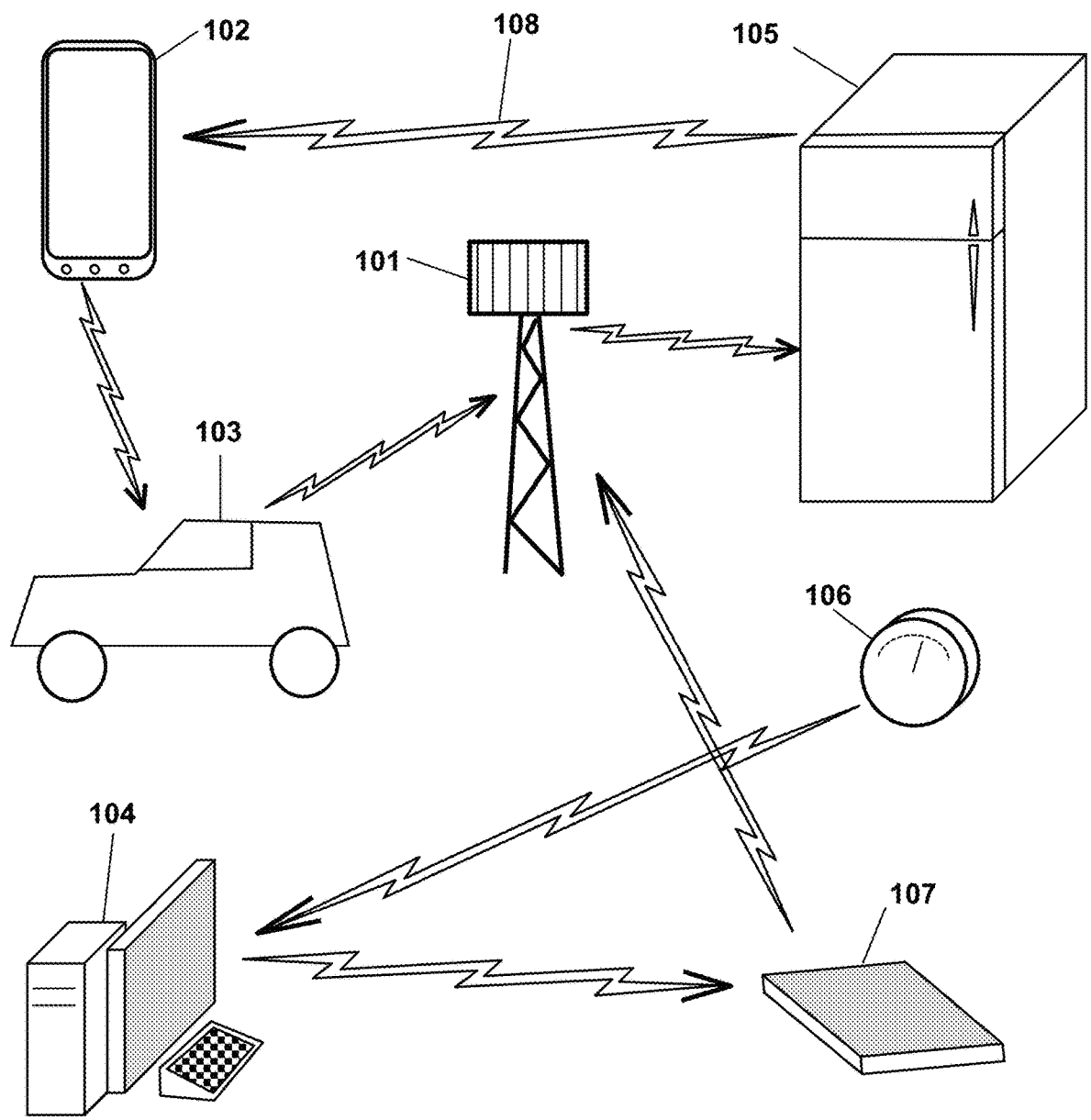
FIG. 1 is a sketch showing a variety of devices communicating wirelessly, according to some embodiments.

Systems and methods are disclosed herein (the "systems" and "methods") that can provide urgently needed protocols for improved scheduling of wireless messages, increased throughput, lower delays, fewer wireless collisions, reduced congestion, improved fairness, improved equality among nodes, and elimination of the blocked-node problem, according to some embodiments. Embodiments of the systems and methods may include a "decrementation" protocol that provides shorter delay times for nodes that have already been delayed at least once, thereby providing a competitive advantage to the delayed nodes relative to other nodes which have not yet been delayed. In addition, means are disclosed for managing the delay parameters according to the average traffic density or the transmission failure rate, thereby avoiding unnecessary and repetitious interferences and reducing congestion, according to some embodiments.

Most of the examples below are based on CSMA-CA (carrier-sense multiple-access with collision avoidance) protocols which stem from the IEEE 802.11 protocols, however embodiments of the disclosed systems and methods may be beneficially applicable to other wireless communication protocols as well. Enhancements such as QoS (quality of service) management, multiple-frequency systems, and other variations are not specifically discussed, however these and other enhancements may benefit from the disclosed systems and methods as well, as will be recognized by one of ordinary skill in the art given this disclosure. As used herein, a "wireless message" is information transmitted by radio-frequency waves. Examples of wireless messages are RTS (request-to-send), CTS (clear-to-send), DAT (data), and ACK (acknowledgement) messages. An RTS message is a short message sent by a transmitting node, typically to a base station, requesting permission to send a data packet. A CTS message is a short message sent by the base station or receiving node in reply to an RTS. A DAT message is a longer message that a node sends upon receiving a CTS. An ACK message is a short message sent by the base station or receiving node, indicating that the DAT message was received in good order. A "packet" is a message. A "frame" is a message. A "node" is a communication device that includes a wireless transmitter, a receiver (or a transceiver), and a processor configured to analyze signals from the receiver and to cause the transmitter to transmit messages. For example, mobile phones, smart sensors, personal computers, and interconnected vehicles are among the many types of devices configured to communicate wirelessly. A local area network (LAN) is an array of nodes centered on a "base station", also called an "access point". The base station may communicate with all of the nodes in the LAN. The base station may include an interface between wired and wireless domains using a router or an Ethernet link, for example. The base station may manage the timing and other parameters of the LAN, for example by updating the parameters and communicating the updates to the nodes using periodic "beacon" messages. In some LAN configurations, the nodes communicate only with the base station, while in other configurations the nodes can communicate directly with each other. Base stations may also manage communication between adjacent LANs. Communication links from a base station to the wider network infrastructure are treated as "wired" herein, although they may include many types of information transfer technologies including conductive cables, optical fibers, microwave beams between fixed sites, satellite links, etc. Unless otherwise specified, the examples provided herein assume an isolated, managed LAN without direct node-node communication. "Traffic" is the amount of wireless communication detected by each of the nodes or by the base station (not to be confused with vehicle traffic). A "collision" is interference between two simultaneous wireless messages on the same channel, which generally results in both messages being garbled (not to be confused with physical collisions between vehicles). A "channel" is a frequency band used for wireless communication. "Wireless traffic density" is a measure of the amount of a communication channel that is occupied by wireless messages. In examples herein, the wireless traffic density may be represented by a parameter P, which equals 10 million times the probability that a particular node initiates a new message in a particular time slot. A message has been "successfully transmitted" and "successfully received" when the intended recipient receives it; the two terms are used interchangeably herein. "Transmission failure rate" is the number of RTS, CTS, and DAT message transmissions or attempted transmissions per unit time, that fail to receive a confirmatory reply. A "confirmatory reply" for an RTS is a CTS, for a CTS is a DAT, and for a DAT is an ACK. There is no confirmatory reply for an ACK. "Congestion" is a condition in which the wireless traffic density is so high that most of the nodes in a LAN spend most of their time waiting for a chance to send their messages. "Completion" refers to a complete RTS-CTS-DAT-ACK sequence successfully received. "Beacons" are messages broadcast by a base station to the nodes in its LAN, for purposes of management. A "carrier signal" is a wireless signal indicating that a message is in progress or is imminent. A node is "blocked" if it is forced to delay indefinitely while other nodes, with the same status or priority, are permitted to transmit multiple times.

The nodes and the base station all share a common medium or channel, such as a specific frequency range, and only one transmitter can successfully operate on that channel at a time. Therefore, a protocol is needed to sequence the various messages and avoid wireless collisions. Nodes that are ready to transmit a message may compete with each other for access. Typically, each node is forced to wait until another already-transmitting node finishes, plus an additional predetermined "waiting interval", and may then compete for access during a contention window. A "contention window" is a predetermined interval of time during which a node may transmit a message, unless the channel is already busy. A "slot" is a unit of time, such as 10 microseconds or 20 microseconds typically; delay intervals are commonly subdivided into slots. "Rand" represents a randomly selected delay within the contention window. "Random" and "pseudorandom" are treated as equivalent herein. A node wishing to send a message may select, at random, a portion of the contention window, and may transmit after the waiting interval plus the randomly-selected portion Rand of the contention window, unless another node is already transmitting at that time. The total delay, termed the "backoff" delay, is then the waiting interval plus Rand. Some references call the waiting interval CWmin, meaning the starting time of the contention window. Likewise CWmax is the time of the end of the contention window, and CWwid is the width of the contention window. Thus, CWmax=CWmin+CWwid. The backoff time equals the waiting time plus Rand, which equals CWmin plus a random number times CWwid. In engineering terms, the contention window is a delayed gate, wherein the gate is the contention window, and the gate delay is the waiting interval. A node may transmit after the backoff delay if the channel is clear. Backoff delays are intended to spread out the transmissions to prevent multiple nodes from transmitting at the same time. Backoff delays also reduce the traffic density to avoid congestion. However, if the backoff delay is too long, throughput may be reduced. To avoid having multiple transmissions starting at the same time, each node wishing to transmit may first sense whether the medium is busy by detecting any wireless messages or carrier signals that may be present. If no carrier signal is present, the node determines that the channel is clear, and the node may transmit. If the node detects the carrier signal of another message already in progress, the node must wait until the competing message has ended, then wait for the waiting interval, and then wait an additional randomly selected portion of the contention window, and may then begin transmission (unless another node has already started transmitting at that time). On the other hand, if the node wishing to transmit is already in a backoff delay, then the node may simply stop timing its backoff delay while the other transmission is in progress, and then resume timing the backoff delay as soon as the channel is clear. In this way, the nodes compete for an opportunity to transmit while largely avoiding collisions. "Throughput" is the number of successful completions per unit time in the LAN. A "successful completion" or a "completion" is a complete RTS-CTS-DAT-ACK message sequence. In practice, a successful completion may be indicated simply by receiving an ACK message, since this includes all the other messages by implication. A "transmission failure" or "failed transmission attempt" is a wireless message that was not received by the intended recipient in good order. Such failure may be due to a wireless collision or other interference or noise for example. From the point of view of a node, a failed transmission attempt is an RTS which is not followed by a CTS, or a DAT which is not followed by an ACK, or a commit-to-send while either a carrier signal is detected, or a commit-to-send while a Reserved interval is in effect. In each case, a backoff delay is "required". A backoff delay is required whenever a node sends an RTS and fails to receive a CTS, or when the node sends a DAT and fails to receive an ACK, or whenever the node commits to transmit a message while a detectable carrier signal or a Reserve state is present. A backoff delay is not required when a node commits to send a message while no carrier signal is detectable and no Reserve state is in effect. A Reserve state is initiated by each node upon receiving a CTS message from the base station, specifying a duration in which transmissions are prohibited. Then, each node (other than the node to which the CTS is addressed) refrains from transmitting for the specified duration, thereby avoiding collisions. In some embodiments, a node that sends a DAT and fails to receive an ACK may re-transmit the DAT immediately if the channel is not then busy, or may re-transmit the DAT after a backoff delay if interference is detected. In other embodiments, a node that sends a DAT and fails to get an ACK must start all over by sending an RTS, receive a CTS, and then may re-transmit the DAT.

In some embodiments, the waiting interval and/or the contention window may be adjustable. Such adjustments may be made according to the wireless traffic density or other conditions, since shorter delays are generally appropriate for light traffic densities and longer delays for high traffic densities. The delay parameters may be arranged for example to optimize the throughput or the message success rate or to minimize overall delays or other LAN performance metric. A lower limit and an upper limit may be set for each parameter, such as an upper and lower limit for the waiting interval, the contention window, and the entire backoff time, among other parameters. The waiting interval and/or the contention window may be increased or decreased each time the backoff delay is required. For example, the waiting time may initially be set to a predetermined "initial waiting interval", and then increased or decreased successively after each successive failed transmission attempt. Likewise, the width of the contention window may be set at an "initial contention window" value, and then may be increased or decreased after each successive failed transmission attempt. Then, after a successful completion (as indicated by the node receiving an ACK responsive to the node's DAT message), the waiting interval and/or contention window may then be restored to their initial values. Thus when another backoff delay is required after a successful completion, the waiting interval and/or the contention window are restored to their initial values for that subsequent backoff delay. In other embodiments, the node may restore the delay parameters back to their initial values more frequently, such as doing so after receiving a CTS in response to an RTS, as well as an ACK in response to a DAT. Restoring the delay parameters to their initial values under both CTS and ACK receptions would thereby separate the delays associated with sending an RTS from the delays associated with sending a DAT. Most of the examples herein assume that the delay parameters are reset to their initial values only upon completion of the full 4-message sequence. "Incrementation" refers to increasing the waiting interval and/or the contention window after each failed attempt to transmit a message. Thus, with incrementation, on each subsequent transmission attempt, the node is forced to wait longer, on average, than that for the initial attempt. Prior-art systems typically employ incrementation. For example, in typical prior-art systems, the initial waiting interval and/or contention window may be made quite short, such as 1 or 2 slots, and then the waiting interval and/or contention window are doubled upon each successive failed transmission attempt. Such protocols are said to employ "binary exponential" delays. In contrast, some embodiments of the systems and methods disclosed herein may employ decrementation. "Decrementation" refers to decreasing the waiting interval and/or the contention window after each failed transmission attempt, so that on each subsequent transmission attempt, the node is allowed to transmit sooner, on average, than for the initial attempt. Embodiments of decrementation protocols may provide an initial waiting interval and an initial contention window duration which are set according to current wireless traffic conditions, for example to optimize throughput or minimize delays. Then, after each failed transmission attempt, the waiting interval and/or the contention window may be decremented, for example by subtracting a predetermined decrement from each delay parameter. Decrementation may provide a competitive advantage to the delayed node relative to other nodes which have not yet been delayed. Improved fairness and equality follow, according to some embodiments. As used herein, "fairness" means providing a competitive advantage to nodes that have waited longest, relative to other nodes that have not waited so long. "Equality" means providing equal transmission opportunities to all the nodes in a LAN. The "blocked-node problem" is a form of congestion at high traffic density in which one or more nodes in a LAN is forced to remain in a backoff state indefinitely while other nodes are permitted to transmit repeatedly.

The decrementation of the waiting interval and/or contention window, upon each failed transmission attempt, may be performed by the processor of the transmitting node in various ways. For example, the processor can subtract a predetermined decrementation value from the current waiting interval and/or contention window. Separate decrementation values may be applied to the waiting interval and the contention window individually, for further optimization of performance. As an alternative, the waiting interval and/or the contention window parameters may be decremented by multiplying the values by a factor less than 1 upon each failed transmission attempt, thereby providing a sliding scale of decrementation values with the largest decrementations being provided to nodes with the longest current delay parameters. The decrementation may be applied differently to the waiting interval and contention window values, for example by decrementing the waiting interval upon one failed attempt and then decrementing the contention window on the next failed attempt, and continuing in alternation for example. The decrementation value(s) may be set according to a timing parameter of the wireless protocol, such as a slot width or a round-trip communication time or a full RTS-CTS cycle time for example. The decrementation value(s) may be varied according to the magnitude of the interval being decremented, such as making the decrementation value larger when the waiting interval and/or contention window is close to its maximum limit, and smaller when the interval is close to its minimum limit. As a further alternative, the node may calculate each decremented waiting interval and/or each decremented contention window using the number of backoff delays performed by that node, which may be stored in memory for example. The number of backoff delays may be incremented before or after each backoff delay comprising a waiting interval plus a randomly selected portion of a contention window, and may be set to zero after each successful completion or each ACK message reception by the node. Then, whenever a backoff delay is required, the node may calculate a fully decremented waiting interval by multiplying the number of backoff delays by a predetermined waiting interval decrementation value, and subtract that product from the initial waiting interval. Likewise, the node may calculate a fully decremented contention window by multiplying the number of backoff delays by a predetermined contention window decrementation value, and subtract that product from the initial contention window. It is immaterial whether the delay parameters are decremented incrementally upon each backoff delay, or are calculated anew using the current number of backoff delays, since the resulting effect is the same for both methods.

To adjust the initial waiting interval and/or the contention window, a node may sense the state of the channel at various times and determine how often a carrier signal is present. The node's processor can then adjust the initial waiting interval value and/or the initial contention window value, for example in order to optimize a performance metric, such as throughput. In an embodiment, the processor may adjust the initial waiting interval longer in high-density traffic to prevent congestion, and lower in low-density traffic for faster access, and likewise for the initial contention window. Alternatively, the initial values may be set by the base station, wherein the base station may monitor the wireless traffic density and may broadcast beacon messages to the nodes dictating the initial waiting interval and/or the initial contention window and/or other delay parameter values. The initial waiting interval and/or the initial contention window may be adjusted together or separately, for example using different decrementation values. The parameters may be further adjusted depending, for example, on whether the interfering messages are long or short in duration, whether the competing messages come from a few highly active nodes or from a large number of nodes acting separately, and other things that affect media access.

Turning now to the figures, FIG. 1 is a schematic showing a base station 101 and numerous wireless nodes 102-107 including a cellular phone 102, a vehicle 103, a computer 104, a smart refrigerator 105, an autonomous sensor such as a thermostat 106, and a tablet computer 107. Embodiments of the systems and methods disclosed herein may be designed to manage the wireless messages 108, for example to reduce congestion and improve fairness regarding transmission opportunities and delay times.

Figure 2:
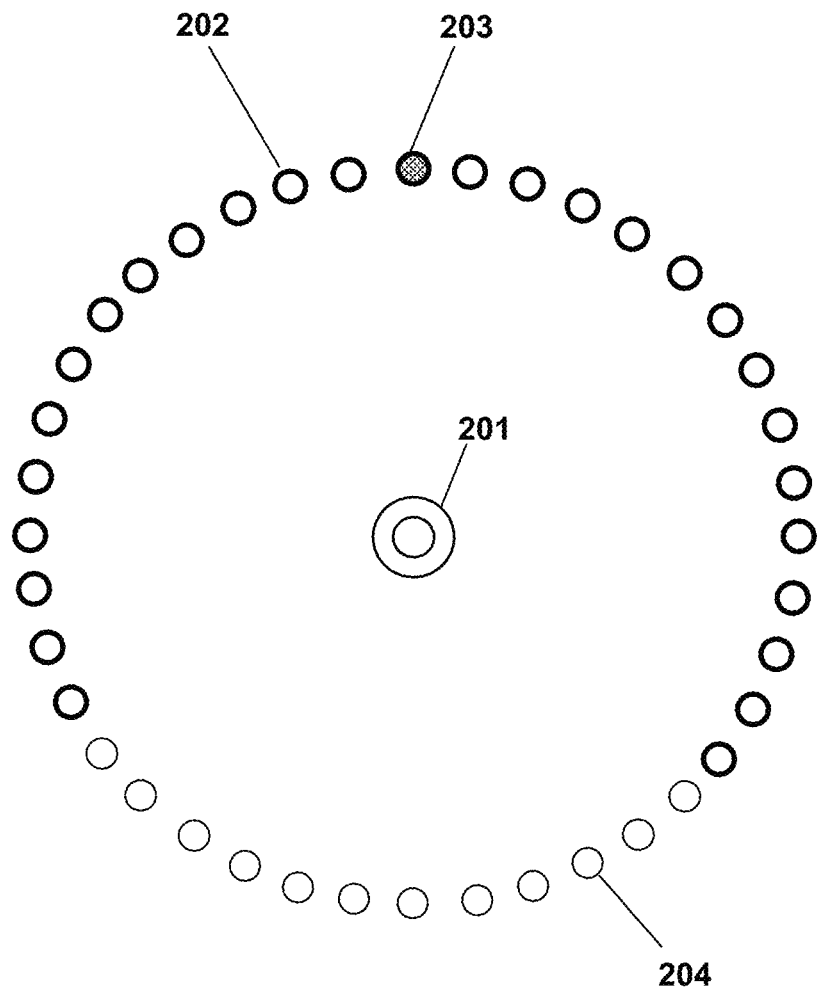
FIG. 2 is a schematic showing an exemplary LAN comprising an array of nodes around a base station, according to some embodiments.

FIG. 2 is a schematic showing an exemplary LAN comprising a base station 201 and a number (in this case 40) of nodes 202 arrayed around the base station 201. The nodes 202 communicate only with the base station 201, not with each other in this example. Due to the various inter-node distances, each node can detect signals from only some of the other nodes, and the remaining nodes are "hidden". In the figure, a particular node 203 (shaded) can detect signals from the other nodes 202 shown heavy, but not from the more distant nodes 204 shown light. In this case, each node 202 can detect signals from twenty-seven of the other nodes, and the diametrically opposite twelve nodes are hidden. However, all of the nodes 202 can communicate with the base station 201, and the base station 201 can communicate with all of the nodes 202; thus none of the nodes 202 is hidden to the base station 201.

Figure 3:
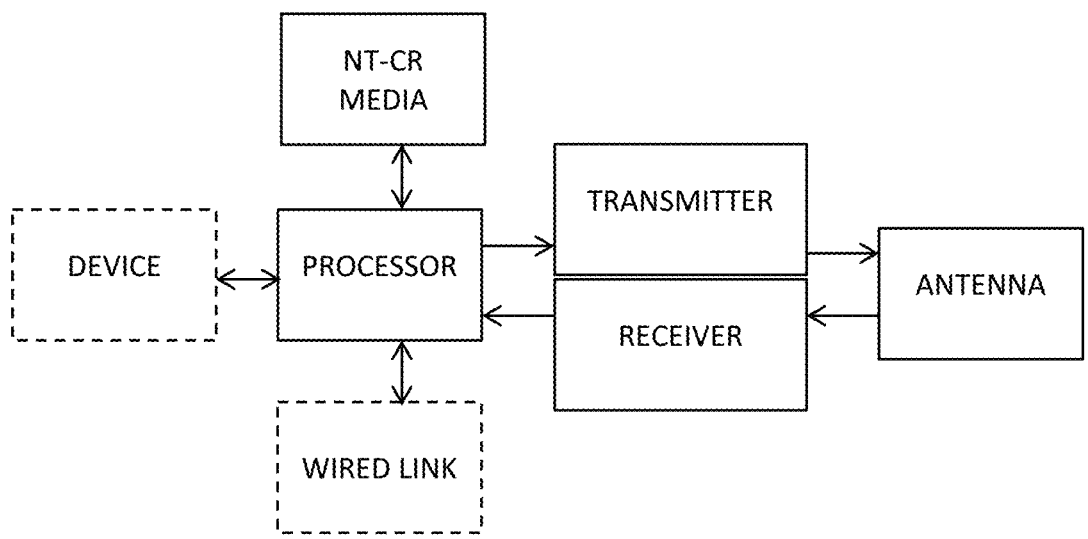
FIG. 3 is a schematic showing parts of an exemplary node, according to some embodiments.

FIG. 3 is a schematic showing components of an exemplary node, according to some embodiments. A processor (such as a computer, microcontroller, FPGA, ASIC, etc.) may send data to a transmitter which may send electromagnetic signals to an antenna, which may emit electromagnetic waves comprising a wireless message. The same antenna may receive electromagnetic energy comprising wireless messages from other nodes or from the base station, and may convey the energy to the receiver, which may convert the energy into a form that the processor can recognize. In addition, the processor may be operatively connected to non-transient computer-readable media ("NT-CR media") containing data and/or instructions for methods. Nodes are usually connected to a device (shown in dash) such as a vehicle or sensor or mobile phone, for example. A base station, on the other hand, usually includes a wired connection to a larger network such as the Internet, using a router or other instrumentation for example.

In some embodiments, the transmitter and receiver may be combined into a transceiver. In some embodiments, two separate antennas may be provided, one for the transmitter and a second antenna for the receiver, thereby allowing separate optimization of the high-power transmission and the low-power received signal.

Figure 4:
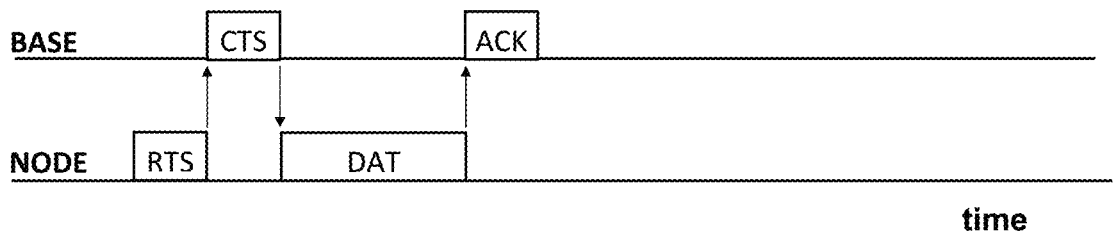
FIG. 4 is a sequence chart showing an exemplary sequence of messages in wireless communication, according to some embodiments.

FIG. 4 is a sequence chart showing various messages as a function of time. A "sequence chart" is a chart showing events versus time along a horizontal axis, similar to the display of a logic analyzer. Arrows indicate sequential timing. Minor delays due to the speed of light and the like are ignored here and in all the examples.

In the protocol shown, a node wishes to send a data packet DAT to a receiving entity, which in this case is the base station. But first, the node obtains permission to transmit, by sending an RTS message. Typically the RTS includes the address or other identifier of the transmitting node, the address or identifier of the intended recipient, an indication that this is an RTS message, and optionally a duration value indicating how long the node desires to occupy the channel for the subsequent DAT and ACK messages. The receiving node, typically the base station, may then send a responsive CTS message granting access. The transmitting node may then send the data package DAT, after which the base station may send an ACK acknowledgement if the DAT was received in good order.

Figure 5:
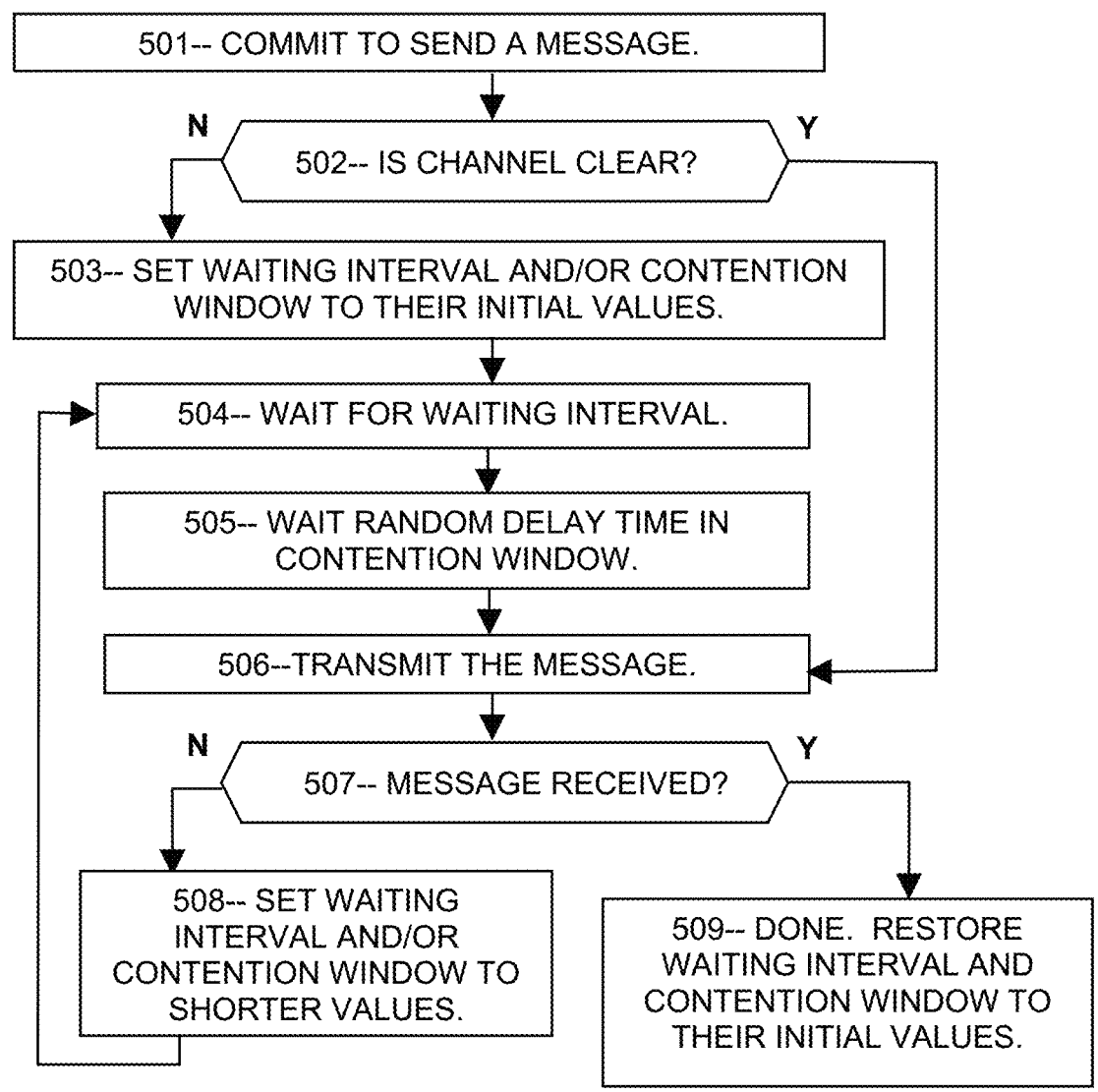
FIG. 5 is a flowchart showing an exemplary method for adjusting the timing of wireless messages, according to some embodiments.
Figure 6:
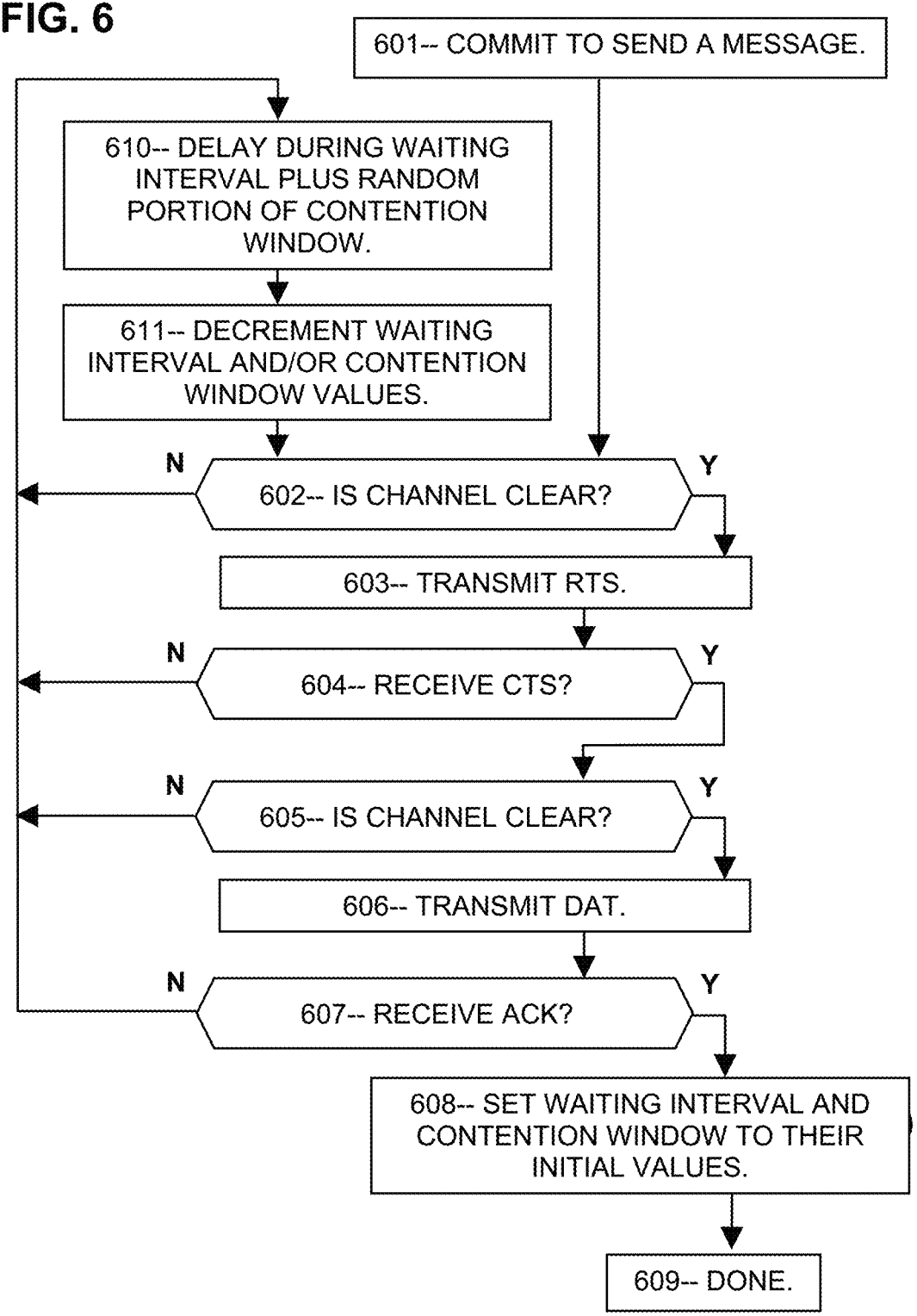
FIG. 6 is another flowchart showing an exemplary method for adjusting the timing of wireless messages, according to some embodiments.

FIG. 5 is a flowchart showing an exemplary method for sending a wireless message. The depicted protocol uses decrementation to adjust the waiting interval and/or contention window after each failed transmission attempt. Decrementation of the delay parameters may provide improved throughput and fairness, according to some embodiments disclosed herein. In the context of the figure, fairness is enhanced when a node that has previously been forced to delay its message is then given a competitive advantage relative to the other nodes. The competitive advantage in this case is a shortened waiting interval and/or contention window. With this advantage, those nodes that have waited the longest then become first in line as soon as a transmission opportunity occurs. In this example, the node then restores the waiting interval and the contention window back to their initial values after receiving either a CTS or an ACK confirmatory reply (FIG. 6 shows the opposite arrangement).

At 501, the node decides or commits to send a message. This "commit to transmit" decision may be in response to an incoming message, or to an event or circumstance related to the node itself, such as a sensor reaching a temperature limit, or a tablet computer checking email, or other event. The node may be operated by a human, in which case the human may decide when to commit to sending; however the actual transmission time is then determined by the depicted method so as to avoid collisions.

The node may check the communication channel, using a receiver, and may determine at 502 whether the communication channel is clear. If another node is currently transmitting a message (or a carrier signal) on the channel, the node can initiate a backoff delay at 503 by setting the waiting interval and/or contention window parameters to their predetermined initial values. Then at 504, the node may wait the initial waiting interval, and then may additionally 505 wait a randomly selected portion of the initial contention window, and then 506 may transmit the message (assuming the channel is clear at that time).

Returning to block 502, if the channel is clear (or at least the node cannot hear any signals from the non-hidden nodes) at the commit time, then the node can immediately transmit the message at 506 as shown. The node may then determine at 507 whether the message has been received by listening for (or receiving) a confirmatory reply message such as a CTS or ACK message. If the node's initial message was not received, or if it was garbled by interference or collision, or other mishap, then no such confirmatory reply would be generated by the receiving entity. Likewise, if a confirmatory reply is transmitted by the receiving entity, but the reply was collided with or interfered with or otherwise garbled, then the original node would not recognize the garbled message as a confirmatory reply. In each such case, the node then performs another backoff delay, followed by another attempt to transmit the message.

In some embodiments, the second waiting interval and/or the second contention window may be made shorter than the initial waiting interval and/or initial contention window. Decreasing those values may result in improved fairness by allowing delayed nodes to acquire a competitive advantage relative to the other, undelayed, nodes. For example, the initial waiting interval and/or the initial contention window may be decremented at 508 by subtracting a predetermined decrement from one or both of those intervals, or by multiplying them by a predetermined factor less than one, or otherwise arranging to reduce the values. Then at 504 a second backoff delay is started using the updated (decremented) waiting interval and/or contention window values. This cycle may be repeated until the message is finally received at 509, at which time the waiting interval and/or contention window values are returned to their initial values in preparation for transmitting a subsequent message. The waiting interval is intended to avoid multiple stations trying to transmit as soon as a previous message ends, and the contention window is intended to spread out the competing transmissions in time to avoid further interference.

The example shows two blocks, 503 and 509, in which the waiting interval and the contention window are set back to their initial values. This redundancy is to illustrate two ways the resetting could be done. It is not necessary to do it twice.

FIG. 6 is a flowchart showing another exemplary method for setting the timing of messages, according to some embodiments. This time the delay parameters are reset back to their initial values only after a complete RTS-CTS-DAT-ACK sequence is successfully received, rather than doing so after each CTS as in the previous example.

At 601, a node decides to transmit a message, and at 602 it checks whether the channel is clear. If the channel is not clear at 602, the node delays during a backoff interval comprising a waiting interval plus a random portion of a contention window at 610, and then decrements the values of the waiting interval and/or the contention window at 611. Reducing the size of the waiting interval and/or the contention window after each backoff delay thereby provides a small but significant competitive advantage to the delayed node relative to other nodes that have not endured such a delay, or has had fewer such delays. By allowing the delayed node to transmit sooner, on average, than the undelayed nodes, the depicted process provides improved fairness in resource allocation, as well as other benefits in LAN performance.

If at 611 the decremented waiting interval value is below its lower limit, then the waiting interval value is not further decremented but is set equal to that lower limit. The contention window is likewise maintained at or above its predetermined lower limit value. The initial values, upper and lower limits, and the decrementation amounts may be assigned according to, for example, data stored in non-transient computer-readable media, and may be dictated or updated by the base station. The initial values and/or the other values listed and/or other parameters may be determined based on the current wireless traffic density, the current collision rate, the current transmission failure rate, or other LAN performance metric, or otherwise predetermined.

If the channel is found to be clear (that is, the node's receiver detects no interfering carrier signals or messages) at 602, then the node transmits its RTS message at 603. The node then listens for (or attempts to receive) a confirmatory CTS message indicating that the RTS message was received in good order. The listening may be continued for a predetermined interval such as a listening interval. For example, the listening interval may be determined according to the maximum anticipated time for the RTS message and the CTS message to travel between the node and the base station at the speed of light, plus a response time of the base station, plus optionally an additional time to ensure that the CTS is not missed. The listening time may be a small number of time slots, such as 1 or 2 slots, preferably sufficient to determine whether a message (presumably a CTS) is forthcoming. Alternatively, the listening time may be made longer so as to include the entire CTS message, thereby allowing the listening node to verify that the expected CTS message is received in good order before determining that the confirmation is valid.

If the node fails to receive a CTS at 604 in the predetermined interval, due to a collision or other mishap, then the node returns to 610 for another backoff delay. If the node receives a CTS at 604, then the node may again check at 605 to be sure that the channel is still clear. If the channel is now busy, due to an intruding message or other interference, then the node returns to 610 and again performs a backoff delay. If the channel is clear at 605, the node then sends its data package DAT at 606.

After transmitting the DAT message, the node then listens for an expected ACK confirmatory message during another predetermined listening interval. If at 607 the node fails to receive the ACK in that time, it returns to 610 and starts the entire process over again including an RTS message. But if the node receives the ACK confirmation, the node has thereby obtained completion of a full 4-message handshake, and therefore at 608 the node restores the waiting interval and/or the contention window back to their initial values in preparation for a subsequent message, and then is done at 609. Restoring the delay parameters back to their initial values after each successful message completion thereby removes the competitive advantage that the node had while it was delayed. In this way the node makes room for other nodes to have that advantage when they become delayed. The delay parameters are restored to their initial values after each successful completion or before each new message is initiated, in the depicted embodiment.

The flowchart shows the node decrementing the waiting interval and/or the contention window successively upon each backoff instance at 611. Alternatively, the node may record, in memory for example, the number of times that the node has performed a backoff delay since the last successful completion. The node may then calculate the fully decremented waiting interval value and/or contention window value(s) anew upon each successive backoff occurrence, using the number of backoff delays so far performed. For example, if the node has had three backoff delays since the last successful completion, and now must backoff a fourth time, the node may calculate the decremented waiting interval equal to the initial waiting interval minus three times the waiting interval decrementation value, and/or may calculate the decremented contention window equal to the initial contention window minus the number of backoff delays times the contention window decrementation value. It is immaterial whether the waiting interval and/or the contention window are decremented successively upon each backoff instance, or are calculated anew based on the number of backoff delays since the last successful completion. "Decrementation", as used herein, includes both of those calculation procedures, as well as other calculation procedures that result in successively reducing the waiting interval and/or the contention window and/or other delay parameters upon each successive backoff delay instance.

Figure 7:
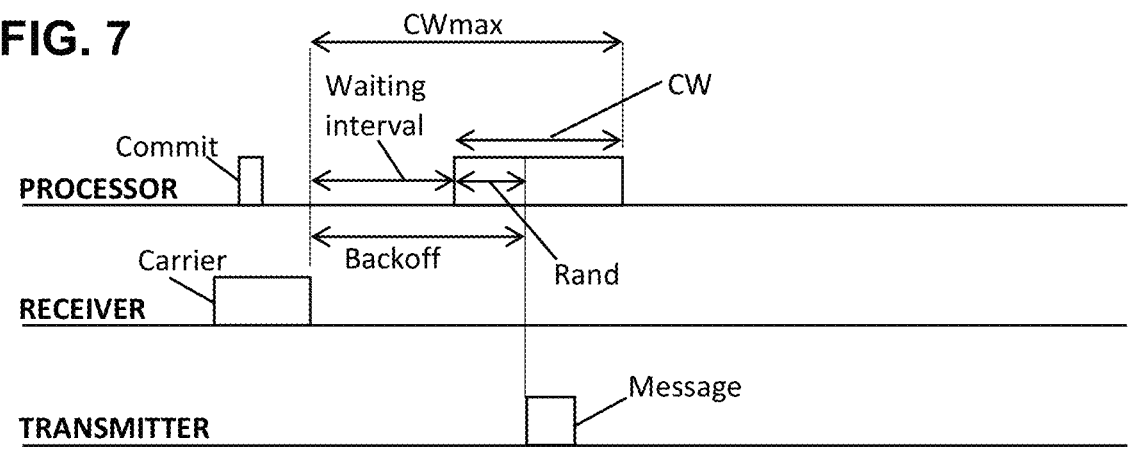
FIG. 7 is a sequence chart showing intervals of an exemplary sequence for transmitting a wireless message, according to some embodiments.

FIG. 7 is a sequence chart in which the horizontal axis represents time, and the vertical axis represents signals or events or time periods related to actions of subsystems of an exemplary node, according to some embodiments. In the top line, labeled "Processor", events related to the node's processor are shown versus time, and likewise for events related to the receiver and the transmitter in the other two lines. Thin vertical lines indicate synchrony between various events.

The processor decides to prepare a message for transmission at the block Commit. In this example, however, the receiver detects an ongoing interference signal Carrier, from another node, and therefore the message must be delayed. The processor first imposes a predetermined waiting interval followed by a predetermined contention window. At a randomly selected time Rand within the contention window CW, the message is transmitted. Also shown are the backoff interval, equal to the waiting interval plus Rand, and the maximum delay CWmax which is equal to the waiting interval plus the contention window.

The depicted example provides for the waiting interval to begin after the Carrier signal subsides. In another embodiment, the waiting interval may begin as soon as the processor decides to prepare a transmission, thereby saving time if the Carrier signal subsides quickly (that is, before the backoff delay expires). In addition, if the Commit time occurs when there is no interference present, the message may be transmitted immediately, without imposing the backoff delay at all.

Figure 8:
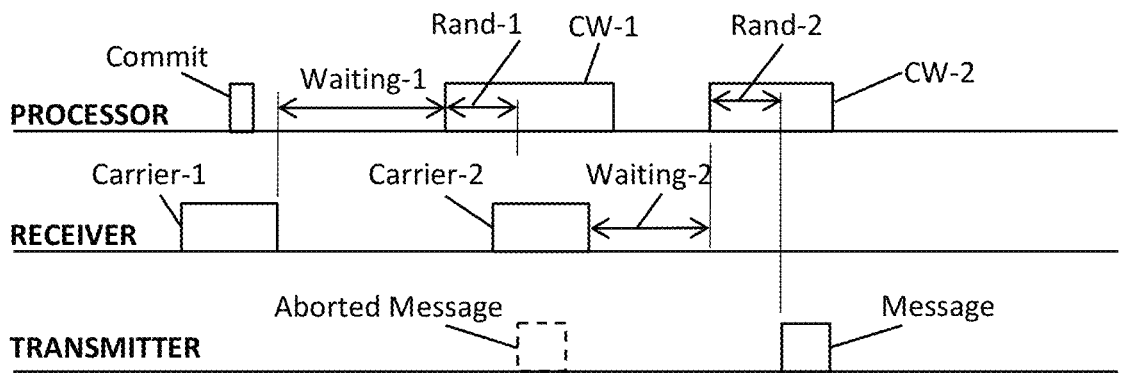
FIG. 8 is a sequence chart showing intervals of an exemplary sequence for transmitting a wireless message while avoiding interference, according to some embodiments.

FIG. 8 is a sequence chart showing an exemplary transmission case involving additional interference, according to some embodiments. Again the processor commits to transmit while the receiver detects an interfering signal Carrier-1 in progress, and therefore the processor imposes a first waiting interval Waiting-1 plus a randomly selected delay Rand-1 within the contention window CW-1. However, a second interference Carrier-2 has occurred at that time, causing the processor to abort the message ("Aborted Message" shown in dash) and to impose a second waiting interval Waiting-2, which in the depicted case starts when Carrier-2 ends.

After the Waiting-2 interval, plus a randomly selected Rand-2 delay within a second contention window CW-2, no further interference is present (or at least no further interference is detected by the receiver), and therefore the message is transmitted by the transmitter.

As may be seen in the figure, the second waiting interval Waiting-2 is made shorter than the initial waiting interval Waiting-1, and also CW-2 is made shorter than CW-1. The shortened intervals may provide the node with a competitive advantage relative to other nodes that have not had a delay, by enabling the delayed node to schedule the next message transmission after a shorter backoff delay, on average. By shortening Waiting-2 relative to Waiting-1, the node that has been forced to delay its message is thereby permitted to begin transmitting earlier in time, on average, than other nodes that have not waited. Likewise, the shorter CW-2 relative to CW-1 further improves the advantage of the withholding node. Nodes that have waited the longest (or the largest number of times), thereby obtain an advantage by being able to begin transmission before the other competing nodes, on average. The protocol thus provides enhanced fairness, by allowing the nodes that have waited the longest to transmit sooner than other nodes that have not waited as long or as many times.

Figure 9:
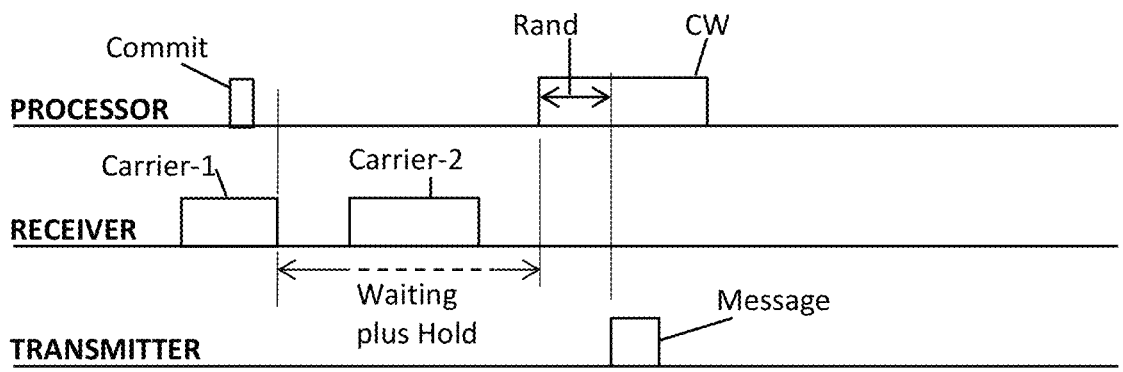
FIG. 9 is a sequence chart showing intervals of another exemplary sequence for transmitting a wireless message while avoiding interference, according to some embodiments.

FIG. 9 is a sequence chart showing an exemplary protocol in which the delay is suspended while interference is detected, according to some embodiments. The processor commits to transmit while the receiver detects Carrier-1 interference due to the carrier signal of another node, and therefore a waiting interval is required. However, a second interfering signal, Carrier-2, occurs during the delay. As indicated by the dashed line, the waiting interval is extended (or put on hold mode) by the same amount of time that Carrier-2 is detected. Thus the length of the "Waiting plus Hold" interval is equal to the predetermined waiting interval plus the length of the Carrier-2 interference. When Carrier-2 finishes, the delay timing then resumes from where it left off, and completes the waiting interval. This is followed by a random interval Rand within the contention window CW, and finally the message is transmitted by the transmitter. By placing the delay time on hold during interference, the node arranges to maintain the delay current (that is, to keep its place in line rather than having to start all over with a new backoff) upon detecting Carrier-2.

The hold mode incidence rate, or equivalently the rate of nodes detecting a carrier signal during a backoff delay, is a sensitive measure of the traffic density and may be used to adjust the initial waiting interval and/or the initial contention window values up or down accordingly.

Figure 10:
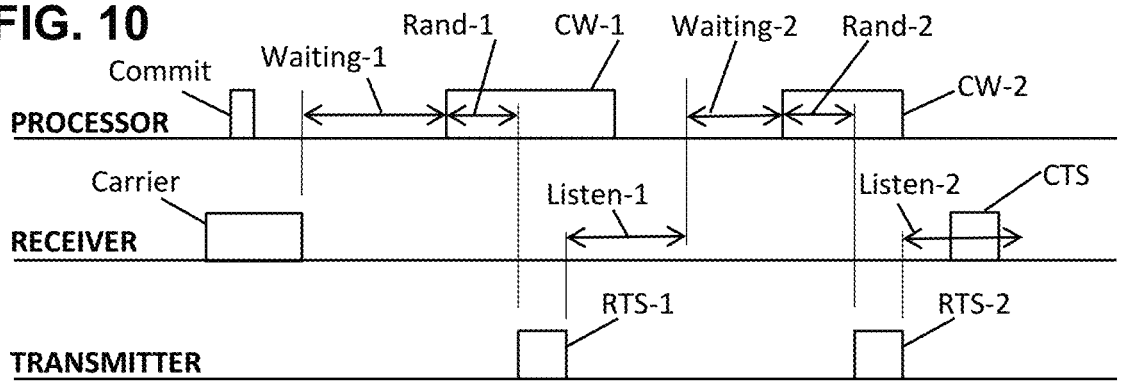
FIG. 10 is a sequence chart showing intervals of an exemplary sequence for transmitting a wireless message and checking for an acknowledgement, according to some embodiments.

FIG. 10 is a sequence chart showing an exemplary response to a failed transmission, according to some embodiments. The processor decides to send an RTS message at Commit, while the interference Carrier is present. This triggers a backoff cycle as in the previous figures, comprising a Waiting-1 waiting interval followed by a random Rand-1 delay within the contention window CW-1. When the Rand-1 delay expires, the node sends message RTS-1, after which the receiver monitors the communication channel during the Listen-1 interval for an expected CTS reply. However, in this case, there is no CTS message, due perhaps to some unspecified problem such as a collision with another message. Therefore, at the end of Listen-1, the processor initiates another backoff cycle including Waiting-2 followed by Rand-2 within CW-2. Importantly, to enhance fairness and overall throughput, one or both of the second set of delays is/are made shorter than the first set. Specifically, in the depicted example, Waiting-2 is shorter than Waiting-1, and CW-2 is shorter than CW-1. These shortened delays thereby give the node a competitive advantage after having a first transmission failure. It may be noted that Rand-2 is not shorter than Rand-1 in this case. Since the randomly-selected intervals are selected randomly, they vary from case to case, ranging from zero or near-zero, to the full contention window width. In the depicted example, the randomly-selected Rand-2 happened to be equal to or larger than Rand-1. On average, however, the total backoff for the second delay cycle will usually be somewhat shorter than for the first delay cycle as shown, and this is sufficient to enable the node to transmit its message ahead of competing nodes, on average. Accordingly, the transmitter sends the RTS-2 message at the end of Rand-2. The receiver again monitors during the Listen-2 interval, and this time it detects the CTS reply.

In some embodiments, the waiting interval may be decremented upon each failed transmission attempt, while the contention interval may remain unchanged. In other embodiments, the contention window may be decremented while the waiting interval may remain unchanged. In further embodiments, the initial waiting interval and the contention window may be decremented by the same amounts or by different amounts. In still further embodiments, the waiting interval and the contention window may be initially made the same length or different lengths, and both may be decremented by the same amount or different amounts, e.g., progressively lesser amounts, including where the decremented progressive amount is a constant, after each failed transmission attempt. Practitioners can try each of these variations to see which one provides the best LAN performance given a particular LAN geometry and traffic, as measured by the largest number of successful messages per unit time, the least number of message collisions, the shortest average delay time per message, or other criterion of LAN performance.

Figure 11:
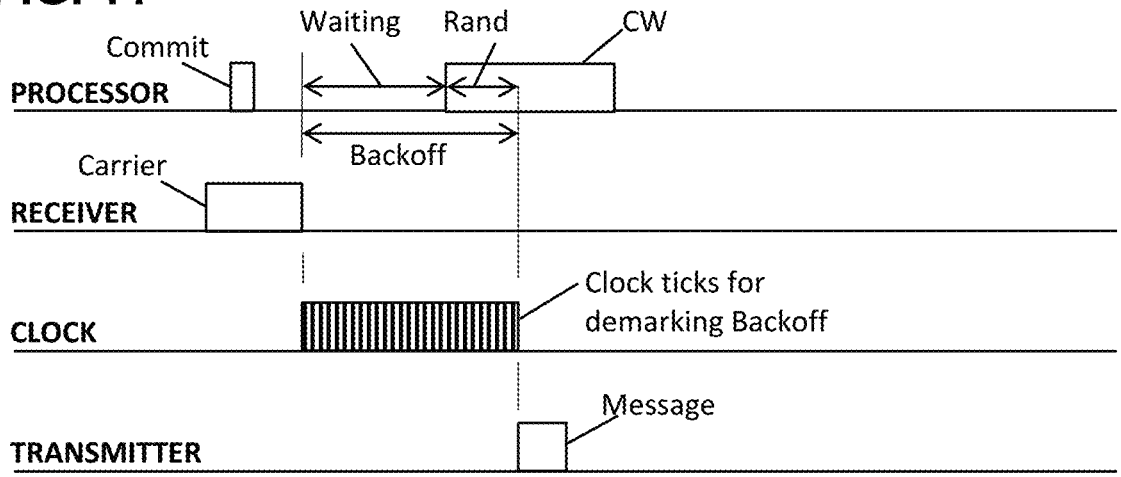
FIG. 11 is a sequence chart showing intervals of an exemplary sequence for transmitting a wireless message using clock timing pulses, according to some embodiments.

FIG. 11 is a sequence chart showing another exemplary protocol for managing a transmission, according to some embodiments. In this case, the timing is determined by counting clock pulses. The number of clock pulses corresponds to the complete backoff time, rather than demarking separate waiting and Rand intervals. The processor can calculate the number of computer clock ticks, or other digital time markers, equaling the length of the planned backoff interval. The processor may then count the ticks (or, more commonly, the processor may decrement a preset total upon each clock interrupt), and then may activate the transmitter to send the Message.

The figure shows clock ticks on a time line labeled "Clock". The processor commits to send a message at the Commit block, but the Carrier interference is present, and therefore the processor begins counting clock ticks starting at the end of the Carrier block. The waiting interval, CW interval, Backoff interval, and Rand intervals are also shown. Message is transmitted when the processor counts up to the predetermined clock tick total, or alternatively when the remaining ticks are counted down to zero.

Figure 12:
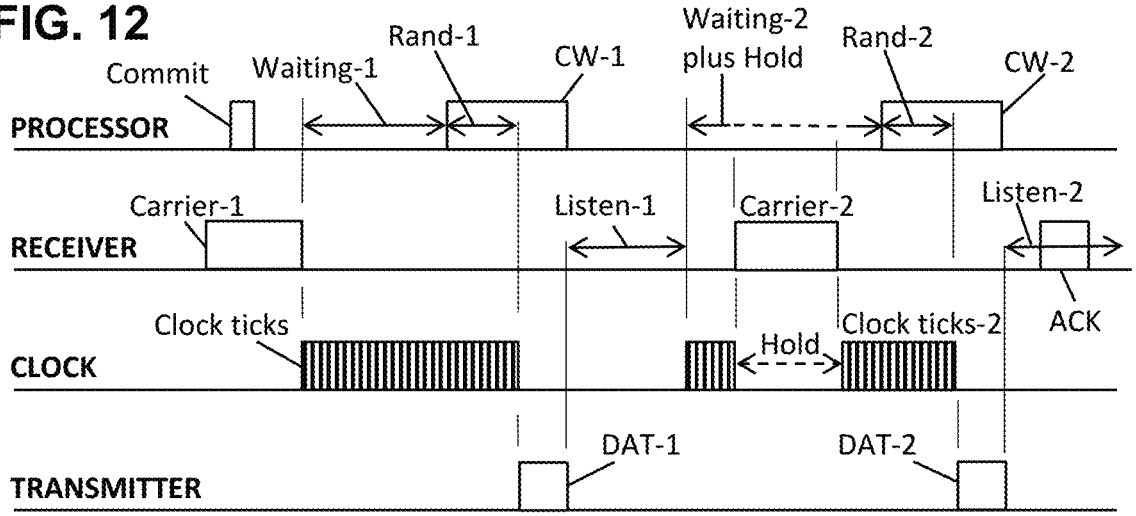
FIG. 12 is a sequence chart showing intervals of an exemplary sequence for transmitting a wireless message using clock timing pulses while avoiding interference, according to some embodiments.
Figure 13:
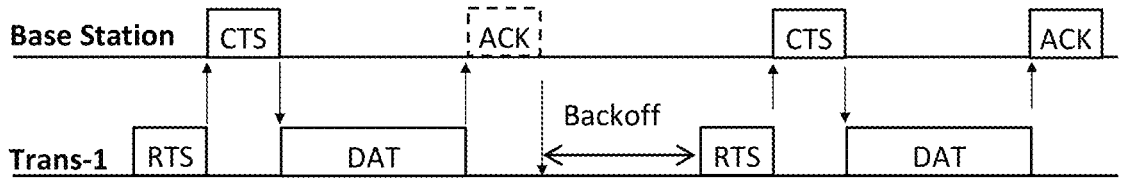
FIG. 13 is a sequence chart showing an alternative exemplary method for avoiding wireless collisions, according to some embodiments.

FIG. 12 is another exemplary sequence chart showing digital timing, including a re-transmission and multiple interference issues, according to some embodiments. This example assumes that a node can re-transmit a DAT message upon failing to receive an ACK acknowledgement, without having to repeat the RTS-CTS sequence again. (FIG. 13 illustrates the opposite assumption.)

The processor commits to transmit a data packet DAT at Commit, having previously completed an RTS-CTS handshake (not shown). However, Commit is during the interference Carrier-1, and therefore the node prepares a chain of clock ticks shown on the Clock line which total the predetermined Waiting-1 plus the Rand-1 intervals. After that delay, the processor transmits the message DAT-1. The receiver then listens for an acknowledgement during the Listen-1 interval, but no acknowledgement message is received in this case. Therefore, the processor again prepares a second backoff (Clock ticks-2) representing the sum of the updated Waiting-2 plus Rand-2 times. As shown by the figure, the waiting interval is decremented upon the second instance. Specifically, Waiting-2 is less than Waiting-1, although in this case the CW-2 window is equal to CW-1 (that is, the contention window is not decremented this time). The waiting interval is decremented upon each failed transmission attempt, but the contention window is not decremented, in this example.

Then, the receiver detects a second interfering carrier signal Carrier-2, occurring while the Clock ticks-2 are counting down. Therefore, the processor suspends the counting while Carrier-2 is present, while maintaining the count at whatever value it had when Carrier-2 was first detected. The suspended counting is represented by a dashed arrow labeled Hold. After the Hold interval, the processor resumes counting Clock ticks-2 from where it left off.

When the Clock ticks-2 interval is finally complete, the processor activates the transmitter to transmit the data again, shown as the DAT-2 message. The receiver then listens during a Listen-2 interval, during which an acknowledgement ACK message was received, indicating that the DAT-2 message was communicated successfully. The example shows an exemplary protocol in which the processor is configured to re-transmit the DAT message after a failed attempt, without having to repeat the RTS-CTS handshaking. In other embodiments, the processor would be required to re-transmit an RTS after the backoff delay, then detect a valid CTS, then re-transmit the DAT message. Practitioners can implement whichever protocol provides the best performance according to their LAN parameters, such as the presence or absence of hidden nodes in the LAN.

FIG. 13 is a sequence chart showing an exemplary failed DAT transmission, in which the node repeats the RTS-CTS handshaking again before re-transmitting the DAT (in contrast to the example of FIG. 12 which featured an immediate DAT re-transmission). Here the base station is shown in the first line and the node's transmitter in the second line. The node transmits an RTS message, to which the base station replies a CTS. The node sends its DAT message and listens for an ACK, however there was a collision or other problem and no ACK was detected (therefore it is shown in dash). Failing to receive acknowledgement, the node starts over by waiting a backoff delay, then again sends the RTS, gets a CTS, re-transmits the DAC, and finally receives an ACK.

Figure 14:
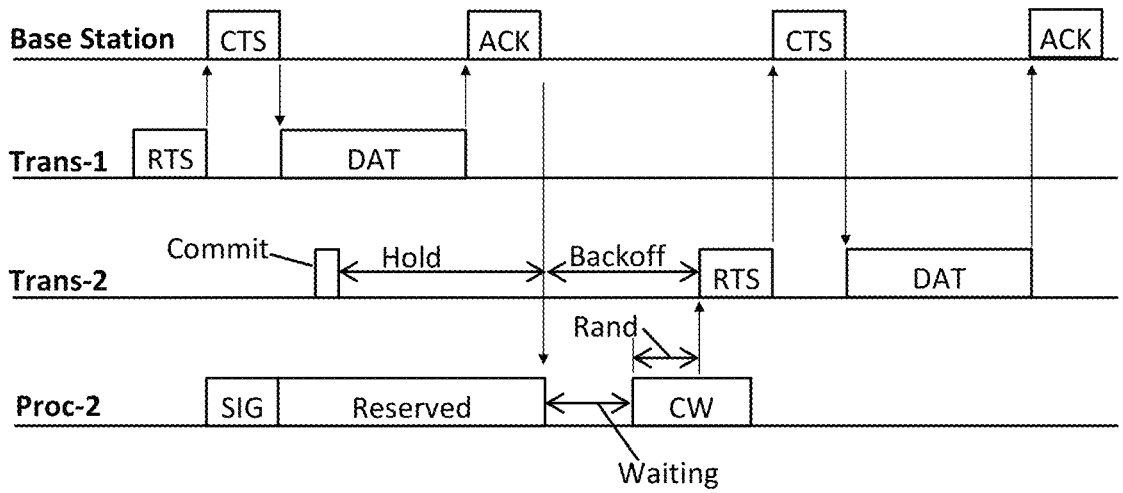
FIG. 14 is a sequence chart showing wireless collision scenarios in an exemplary method, according to some embodiments.

FIG. 14 is a sequence chart showing an exemplary protocol for wireless communication with collision avoidance, particularly showing how the base station can manage multiple nodes seeking to communicate at the same time, according to some embodiments. The line labeled Base Station shows the base station transmitter actions, Trans-1 shows the actions of the transmitter of node-1, Trans-2 shows the actions of the transmitter of node-2, and Proc-2 shows actions of the processor of node-2. Trans-1 starts by sending an RTS message, which the base station replies to with a CTS. Trans-1 then sends its DAT package, which the base station receives and confirms with an ACK reply. In the mean time, node-2 decides at Commit to send a message. However, the processor of node-2, Proc-2, has detected the CTS message which included a duration datum indicating how long node-1 intended to occupy the channel. Therefore, Proc-2 imposed a signal inhibition SIG while the CTS was present (that is, while to the carrier signal from the base station was detected). Additionally, Proc-2 imposed a Hold for the remainder of a Reserved interval equal in length to the planned duration of node-1's DAT+ACK transmission.

Thus Trans-1 transmits an RTS message, receives a CTS reply, then transmits a DAT message, followed by an ACK reply from the base station. At that point, the Hold is terminated and Trans-2 began a Backoff delay comprising a predetermined Waiting interval followed by a randomly selected portion Rand of the predetermined CW interval. At expiry of Rand, Trans-2 then transmitted its RTS message, prompting a CTS reply from the base station. Trans-2 then sends its DAT message and receives an ACK confirmation. In summary, node-2 waited until the carrier signal from the original CTS message was finished, plus the Hold interval based on the duration datum in that CTS message, plus a Waiting interval, plus Rand within the contention window, before beginning its own RTS/CTS/DAT/ACK procedure. In this way, each node is permitted to occupy the channel sequentially, and collisions may be avoided.

Figure 15:
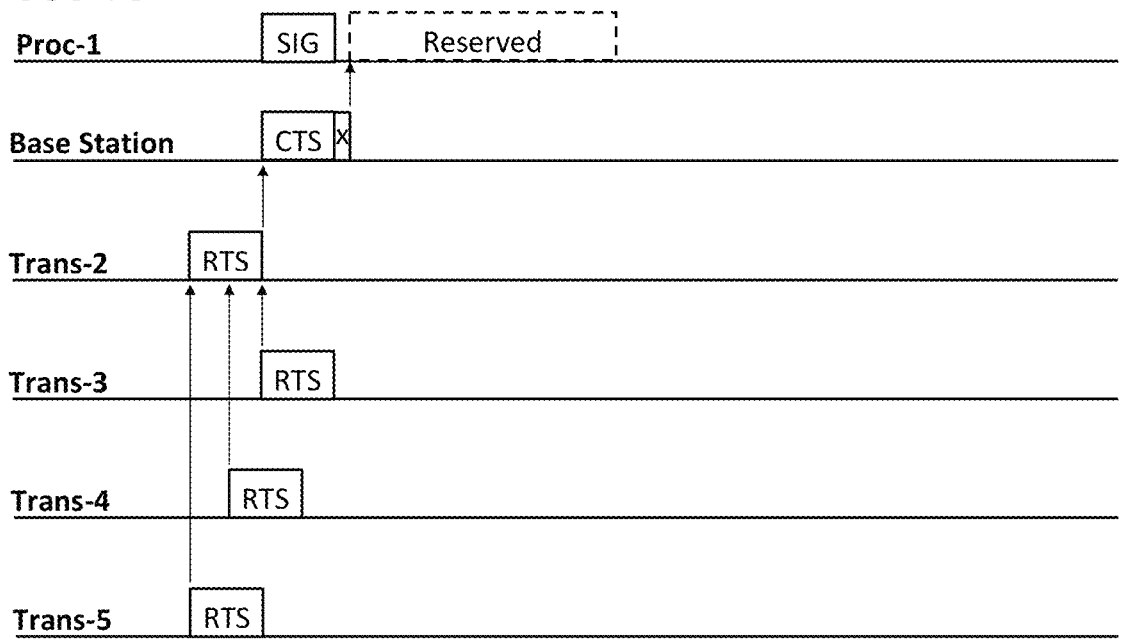
FIG. 15 is a sequence chart showing an alternative wireless collision scenario in an exemplary method, according to some embodiments.

FIG. 15 is a sequence chart showing several ways that collisions can occur despite the best efforts of the Base Station in managing the LAN, according to some embodiments. Actions of a processor Proc-1 of a first node are shown in the first line, actions of the base station are indicated next, followed by the transmitters Trans-2, Trans-3, Trans-4, and Trans-5 of other nodes in the LAN. Trans-2 sends an RTS, for which the base station sends a CTS reply. Proc-1, as well as all the other nodes, detects the CTS carrier signal and therefore they all inhibit transmission during the interval labeled SIG. Some of the nodes may also detect the RTS activity, but in this example the Proc-1 node is too far from the Trans-2 node to detect its RTS carrier signal. All the nodes can detect the base station messages, and therefore SIG occupies the time of the CTS. The CTS message may include a duration datum, which all the nodes can interpret and can withhold their transmitters for the full Reserved interval according to the duration datum. Also, Trans-2 would normally respond to the CTS by transmitting a DAT package, but in this example a collision occurred which garbled the CTS. Therefore Trans-2 did not receive a recognizable CTS and hence did nothing (or initiated a backoff and re-transmission, not shown).

The base station began listening for a DAT message immediately after sending the CTS. Detecting no carrier signal from Trans-2, the base station determined that the DAT was not forthcoming. Therefore, there is no need to impose a Reserved interval of silence. The base station therefore transmitted a very brief beacon message "x" cancelling the Reserved interval, which is shown in dash since it was canceled. Nodes may then transmit at will after the cancellation.

The collision may have occurred in one of at least three ways. Trans-3, the transmitter of a third node, may have been too far from Trans-2 to hear the RTS (that is, the second node was hidden from the third node), and so Trans-3 may have coincidentally transmitted its own RTS message simultaneously with the CTS. Since nodes cannot receive and transmit at the same time, the third node was unable to detect the simultaneous CTS and therefore caused a collision.

Another way the collision could have occurred is shown by Trans-4, which also is a "hidden node" from Trans-2. Trans-4 began transmitting its RTS in the middle of the Trans-2 message, which was hidden from it, and therefore caused a collision.

Another collision scenario is shown for Trans-5, which is not a hidden node from Trans-2. However, Trans-2 coincidentally began sending its RTS at the same time (that is, in the same slot) as the Trans-2 RTS, which therefore collided. In each of these scenarios, the collision garbled the original RTS and/or the CTS, and hence the Reserved interval was either not started or was canceled upon failure to detect a responsive DAT. The other nodes are then free to transmit during that time. However, the two collided nodes (Trans-2 and either Trans-3 or Trans-4 or Trans-5) were not free to transmit right away since, after a failed transmission attempt, they must wait for a full backoff interval before again attempting an RTS. Each of the depicted RTS messages comprised a failed transmission attempt.

Figure 16:
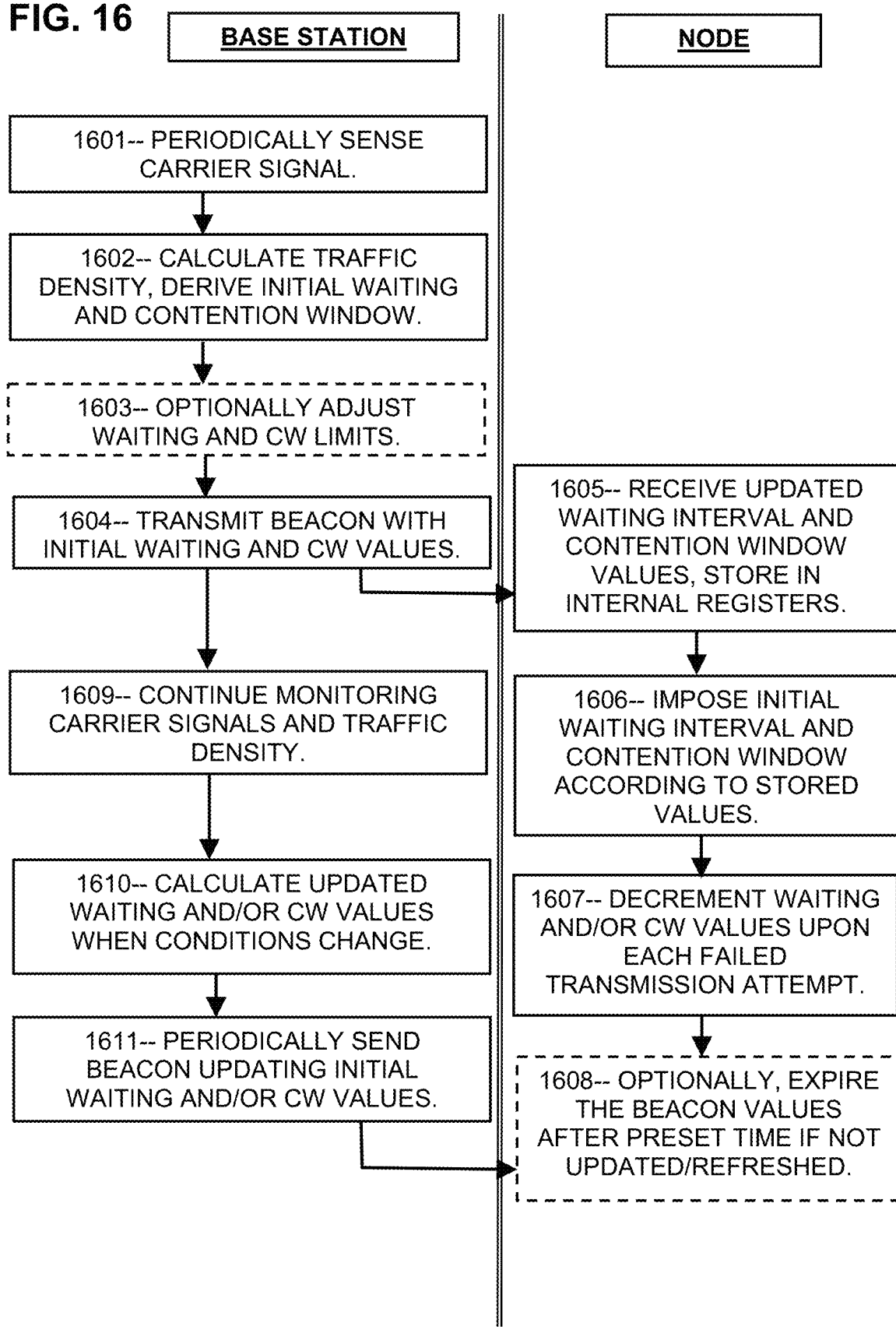
FIG. 16 is a flowchart showing an exemplary method for a base station to set initial waiting interval and contention window values, according to some embodiments.

FIG. 16 is a flowchart showing an exemplary method for a base station to manage the contention window for nodes in a LAN, according to some embodiments. Actions of the base station are shown on the left and actions of a particular node are shown on the right. The base station monitors the data channel at 1601 to detect the carrier signal of any transmitting node, as well as to receive and interpret any messages from the nodes. The carrier signal is an indication of wireless activity. At 1602 the base station analyzes the signal detection results to calculate an average traffic density, or other parameters related to wireless activity in the LAN, and to update the initial waiting interval and/or the initial contention window values to be used by the various nodes. Optionally, at 1603 (in dash), the base station can also adjust other contention window ("CW") parameters, for example to determine decrementation amounts or upper and lower limits on the various delay parameters, or other protocol parameters.

At 1604, the base station may transmit the revised initial waiting interval and/or initial contention window values (and possibly other values such a high or low limits, decrementation values, etc.) to the nodes in a beacon message. The node may receive the updated waiting interval and/or contention window values at 1605, and may store them in registers or other memory means, for use in determining subsequent backoff parameters. At 1606, the node has experienced a failed transmission attempt (not shown) and therefore prepares a backoff delay using the new initial waiting interval and new initial contention window values. At 1607, after each successive failed transmission attempt, the node may successively decrement the waiting interval and/or the contention window by a decrementation amount, and may store the resulting waiting interval and/or contention window values in registers. The decremented values are then used in a subsequent backoff delay, and may be decremented again after each failed transmission attempt. Alternatively, the node may keep track of the number of failed transmission attempts since the last successful completion, and may calculate the fully decremented waiting interval and/or contention window values using, for example, a formula according to that number of delays since the last completion. In either case, the node may prepare a count-down clock for the full backoff delay.

In the mean time, the base station at 1609 may continue measuring congestion and other traffic data, and at 1610 may calculate yet another set of initial waiting interval and/or contention window parameters based on the most recent traffic data. Then, or periodically, or if conditions change significantly, the base station at 1611 may send another beacon message to the nodes, further updating the waiting interval and/or contention window values. In addition, optionally, the node may at 1608 retire or revise the recommended waiting interval and/or contention window values autonomously when appropriate, such as when the base station has been silent for a certain amount of time, or when the node determines that conditions have changed. For example, a vehicle passing through a LAN may join the network temporarily, receive waiting interval updates from the base station, set its initial waiting interval value accordingly, and then exit the LAN as the vehicle moves away. In that case, the vehicle may soon be out of range of the base station and thus would no longer be a node in the LAN. Hence, retiring the recommended parameters may be appropriate, particularly if the vehicle is able to access the wireless traffic conditions itself in real-time and calculate the corresponding waiting interval and/or contention window parameters accordingly.

Figure 17:
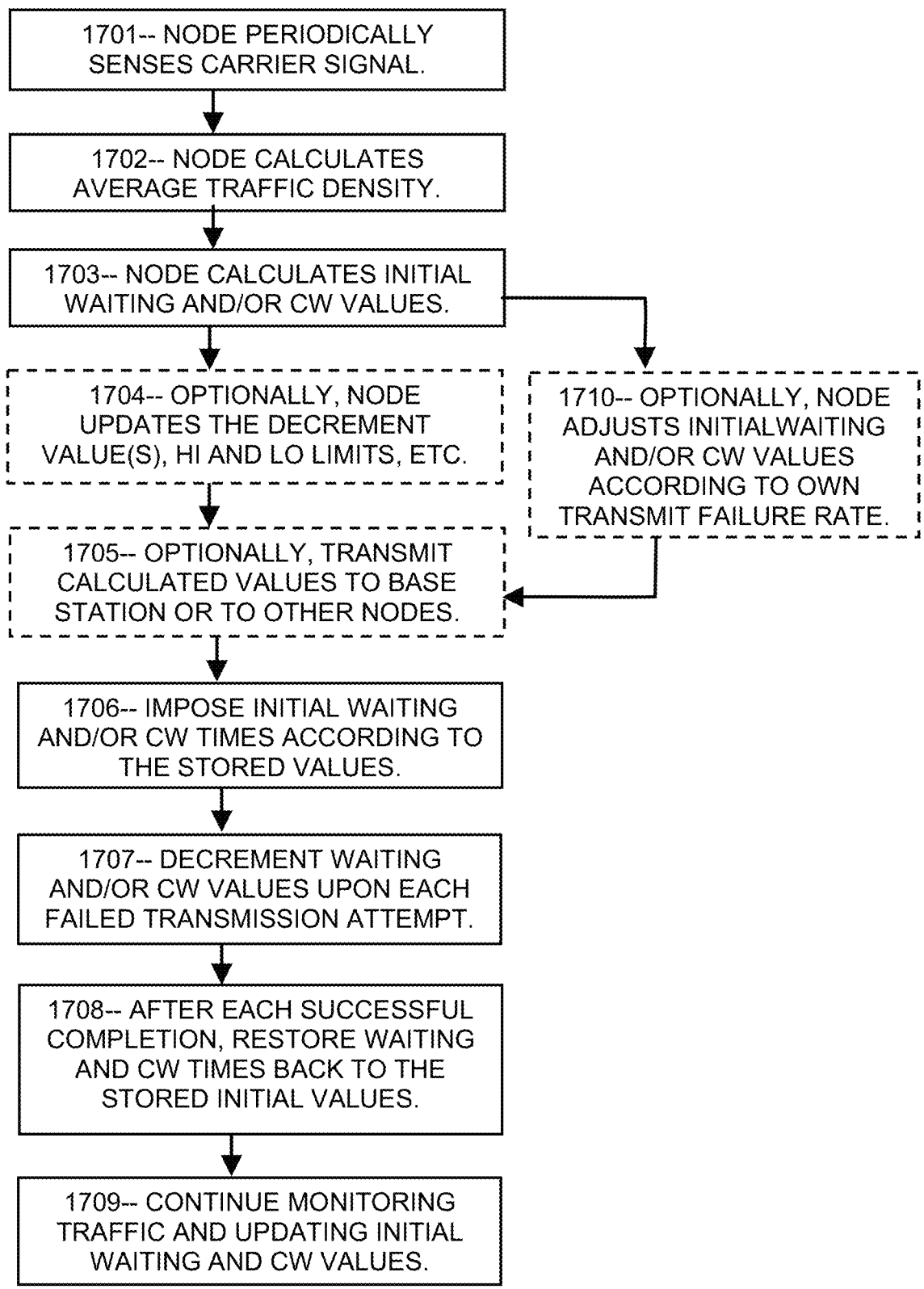
FIG. 17 is a flowchart showing an exemplary method for a node to set initial waiting interval and contention window values, according to some embodiments.

FIG. 17 is a flowchart showing an exemplary method for nodes to adjust their own initial waiting interval and/or initial contention window based on the node's own determination of the wireless traffic density or transmission failure rate or other communication performance metric, according to some embodiments. It may be useful for nodes to adjust their own delay parameters when the base station does not manage the delay parameters, or at other times. At 1701, the node may sense the carrier signal and/or message status of a communication channel periodically (or otherwise), and at 1702 may calculate the average wireless traffic density or other performance metric. The calculation of an average may include a sliding boxcar-type average or a ring-buffer average for example, configured to average a number of sequential carrier signal measurements. Alternatively, the averaging may include a procedure that emphasizes the most recent data over the oldest data such as an incremental average or an age-weighted average, among many other ways to do the calculation.

At 1703, based on the observed wireless traffic density, the node may calculate an initial waiting interval and/or initial contention window value using, for example, a predetermined relationship that relates the delay parameters to the average traffic density. For example, the predetermined relationship may indicate a particular initial waiting interval setting and/or an initial contention window setting, selected for example to minimize congestion, minimize message latency, or maximize fairness and equality, among other possible performance features to be controlled or optimized. The node may then store the updated initial waiting interval value, initial contention window value, and/or other parameter values in, for example, memory or registers of the node's processor. Optionally, at 1704, the node may recalculate or update the values of other delay parameters such as the decrementation amount, the upper or lower limits on the waiting interval or the contention window or the backoff delay, and the like, to further optimize the overall LAN performance for example.

Optionally, at 1710, the node may adjust the initial waiting interval and/or initial contention window values according to the node's own history of transmission attempts, such as the number of retransmissions required to send a message.

At 1705, optionally, the node may transmit the values that the node has determined, thereby providing those values to the LAN base station or to other nodes. In some embodiments, such as where the base station does not manage the LAN delay parameters, or at other times, the node may send a beacon message to all of the other LAN nodes within range, suggesting the new delay values.

At 1706, the node may employ the updated initial waiting interval and/or initial contention window values to set up a backoff delay. At 1707, the node may prepare for a second backoff delay, for example by decrementing the initial waiting interval and/or the initial contention window, and again attempts to transmit the message. After each failed attempt, the node may again decrement the waiting interval and/or the contention window (although not below a predetermined lower limit for each parameter). The node thereby obtains a competitive advantage relative to other nodes that have not been delayed.

At 1708, the node has successfully achieved completion (of a full RTS-CTS-DAT-ACK sequence) by receiving an ACK message from the base station, and therefore the node restores the waiting interval and/or contention window values back to their initial values, so that they are ready for use in preparing the next backoff delay when needed. By restoring the delay parameters back to their initial values, the node thereby provides opportunity for other nodes, which may have waited multiple times, to obtain an advantageous timing position, as fairness would dictate.

At 1709, the node may continue to monitor the wireless traffic density, and to recalculate and update the initial waiting interval and/or initial contention window times accordingly.

Figure 18:
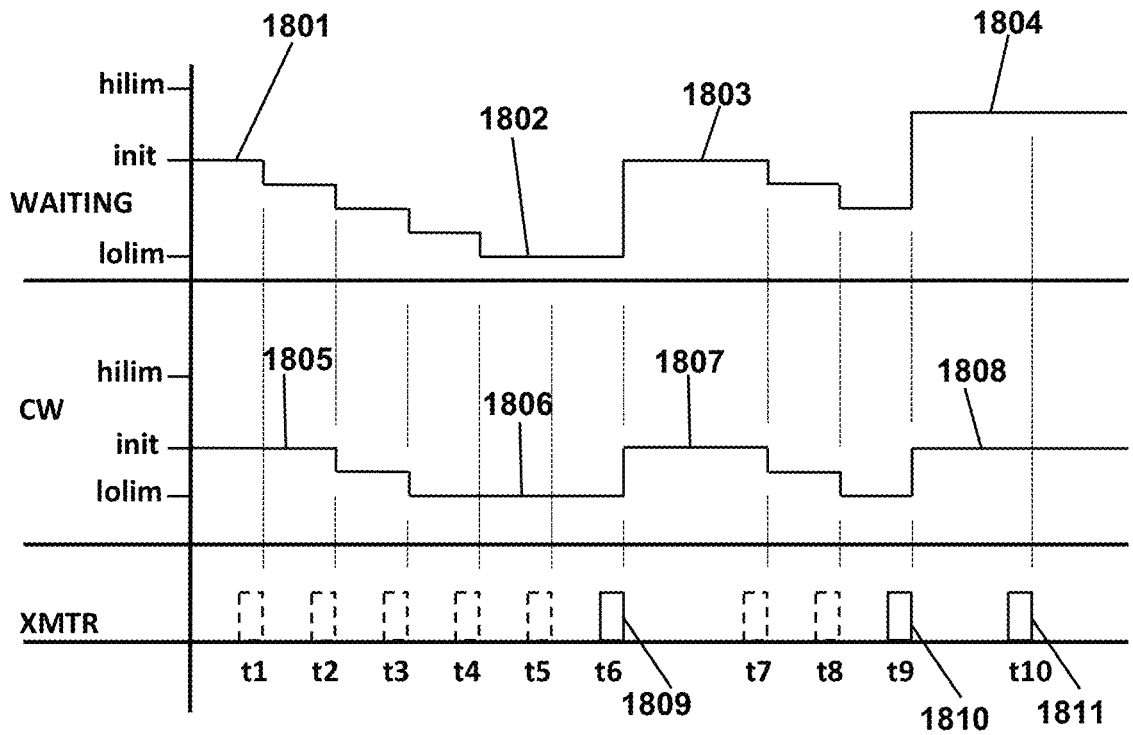
FIG. 18 is a sequence chart showing how exemplary waiting interval and contention window values may be adjusted, according to some embodiments.

FIG. 18 is a timing diagram showing exemplary waiting interval and contention window values as a function of time (horizontal axis), according to some embodiments. The waiting interval values are restricted to be between the upper and lower limit values ("hilim" and "lolim" respectively), and likewise for the contention window values in the middle section. Also shown is the initial value "init" for each parameter. In the lower section labeled XMTR, boxes indicate the activity of the node's transmitter. Unsuccessful transmissions or attempts are shown dashed, and successful transmissions as solid blocks. The individual RTS, CTS, DAT, and ACK messages are implied but not shown specifically. Time labels t1, t2, t3, t4, t5, t6, t7, t8, t9, and t10 are also shown, demarking the various transmission attempts. Thin vertical lines indicate synchrony or a causal connection.

The diagram shows how the waiting interval and/or contention window may be adjusted in response to each successful or failed transmission attempt. At the top, the waiting interval starts at the initial waiting interval value 1801 as shown. Upon each unsuccessful transmission attempt, the waiting interval is decremented until at t4 it reaches the waiting interval lower limit 1802, and thereafter is decremented no farther. Likewise the contention window value starts at its initial value 1805, but in this example the contention window is not decremented at t1 due, for example, to traffic conditions or other reasons. The contention window is then decremented at the t2 and t3 transmission failures, thereby reaching the lower limit 1806, and then remains at the lower limit 1806 thereafter.

At t6, the message is finally transmitted and received successfully, as indicated by the solid XMTR block 1809 at t6. As a result, the waiting interval is raised back to its initial value 1803, and the contention window is restored to its initial value 1807.

A second message transmission was attempted at t7 and t8 but these were not successful, resulting in decrementation of both the waiting interval and the contention window at t7 and at t8. The second message was then successfully transmitted at t9, as indicated by the solid block 1810. The contention window value was then restored to its initial value 1808, however the initial waiting interval value has been changed (1804) and is shown different at this time. The initial waiting interval value was changed between times t7 and t9. Such changes in parameters may be due to changing traffic conditions, for example. Therefore, after the successful transmission 1810, the waiting interval was set at the updated value indicated by 1804. The updated value of the initial waiting interval 1804 is shown higher than the earlier value 1801, which may indicate that the wireless traffic density had increased and therefore the additional delay was necessary to prevent wireless collisions and message congestion.

At t10, a third message was successfully transmitted 1811, with no failures. Consequently, no backoff or other delays are required at that time, and hence the waiting interval and contention window values remain unchanged at t10. The values are generally decremented only upon a transmission failure, and are restored to their initial values upon a successful completion as indicated by receipt of the ACK message.

In general, when the wireless traffic is light, the initial values of both the waiting interval and the contention window may be made much shorter, perhaps being set at their minimum values, which may minimize unnecessary delays for each node. In heavy wireless traffic, the initial values of the waiting interval and/or contention window may be increased sufficiently to optimize access or other LAN performance metrics. The initial waiting time and/or initial contention window may be adjusted independently, or may be set equal or substantially equal to each other, or may be otherwise adjusted according to the wireless traffic density, for example. "Substantially equal" means equal within plus or minus X percent of each other, wherein X is selected from the group consisting of: 15%, 10%, 5%, 2%, and 1%.

As a further option, the initial waiting interval and/or the initial contention window values may be made shorter after each successful completion. A successful completion includes an uninterrupted chain of 4 handshaking messages without interference. The successful completion may indicate that the delay values are unnecessarily long, and therefore may be reduced. In other embodiments, the delay parameters may be reduced only after some number of successive completions, or if the collision rate drops below a predetermined threshold, or if the number or rate of Hold mode conditions drops below a predetermined threshold, or according to another LAN performance metric. For example, if the base station determines that the collision rate is below a predetermined threshold, the base station can reduce the initial waiting interval and/or the initial contention window values by a predetermined amount, and can send a beacon message to the nodes updating those values. Alternatively, or in addition, each node can determine a rate at which the node detects a carrier signal while the node is in a backoff delay (that is, a Hold mode), and when the incidence of such events drops below a predetermined threshold, the node may autonomously reduce its initial waiting interval and/or contention window, or may send a message to the base station suggestion that the delay parameters be so reduced, or may send a beacon message to the other nodes suggesting the reduced values, for example.

Figure 19:
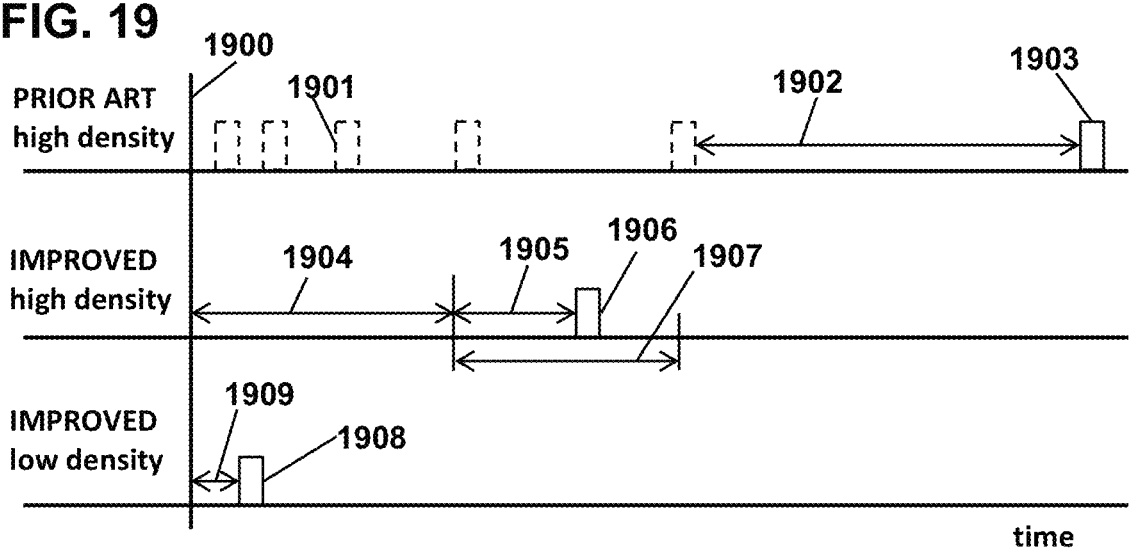
FIG. 19 is a sequence chart showing how an exemplary message may be timed, according to some embodiments.

FIG. 19 is a sequence chart comparing a prior-art protocol with an exemplary improved protocol, according to some embodiments. Examples are shown with low and high traffic density conditions. The line labeled "Prior Art high density" shows a series of RTS attempts versus time, according to prior-art protocols in which each subsequent transmission attempt is delayed by a backoff time which is initially set very short (such as a single slot) and is increased upon each subsequent failed attempt using, for example, a binary exponential delay protocol. Here the vertical line 1900 marks the end of a previous interference signal (not shown), and each failed RTS transmission is shown dashed such as 1901. The failed transmissions 1901 are shown initially close together, and then increasingly separated after each failed attempt, according to the incrementation protocol which increases the waiting interval after each failed attempt. Due to the high traffic density, there are numerous collisions or other transmission failures. The message is finally transmitted successfully at 1903 after a rather long backoff time 1902.

The line labeled "Improved high density" shows an exemplary improved protocol in which the transmission 1906 may be withheld, after the interference 1900, by an initial waiting interval 1904 plus a randomly-selected delay 1905 within a contention window 1907. The length of the initial waiting interval 1904 and the initial contention window 1907 may be set according to the current wireless traffic density, for example, to optimize access or other LAN performance metric. The successful transmission 1906 therefore occurs much sooner with the improved protocol than with the prior-art protocol, in the high-density case shown. The prior-art protocol generated numerous collisions resulting in failed transmissions 1901 until the timing was eventually sufficient to avoid interference. Each of the failed RTS messages 1901 represents wasted bandwidth and delayed access for all the other nodes. The improved protocol, on the other hand, arranged the initial waiting interval and contention window 1804 and 1807 appropriately for the current high level of wireless traffic density, and thereby avoided unnecessary collisions.

The line labeled "Improved low density" shows the same exemplary improved protocol as the Improved high density case, but now with the initial waiting interval and the initial contention window adjusted appropriately for a low wireless traffic density. For example, the LAN base station can monitor the channel, determine the fraction of time that the channel is idle, and then adjust the initial waiting interval and initial contention window accordingly. The adjustment can also be based on the frequency of interference between messages, the fraction of transmissions followed by a CTS or ACK, the rate of detecting a carrier signal during a backoff delay, or other means for determining the current wireless traffic conditions. Interference is unlikely when the traffic density is low, and therefore the initial waiting interval and initial contention window may be made very short at low traffic density conditions, such as an initial waiting interval of zero or one slot for example. The resulting backoff delay 1909 is thus very short, longer delays being unnecessary under low density conditions. As a result, the successful transmission 1908 is achieved promptly. Thus embodiments of the improved protocol can provide fast service under low density traffic conditions, while also adjusting the backoff time to optimize performance at high density conditions when appropriate.

Figure 20:
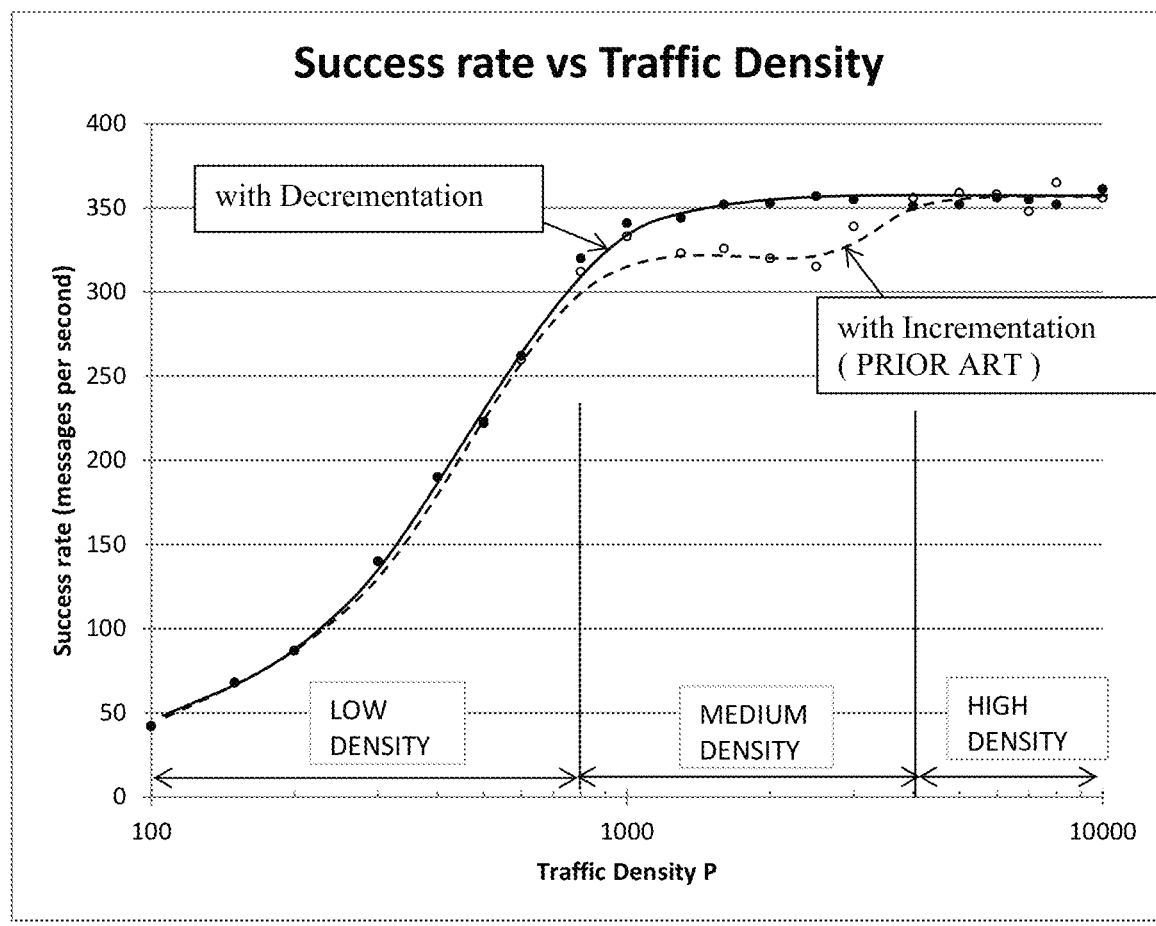
FIG. 20 is a chart comparing simulated success rates for a prior-art system versus an exemplary wireless system, according to some embodiments.

FIG. 20 is a chart showing results of a computer simulation of an exemplary LAN with various levels of traffic density. The simulation included 40 nodes around a base station as shown in FIG. 2, with each node being hidden from 12 of the other nodes respectively, and detectable from the remaining nodes. Each node in the model was able to initiate messages independently and at random times. Each node initiated a message by sending an RTS message to the base station. If the channel was busy at the time a node committed to send, the node then waited for a backoff interval and then sent the RTS. The base station responded with a CTS if there were no collisions, after which the node sent its DAT package, and then the base station sent an ACK confirmation. Nodes refrained from transmitting whenever the base station or one of the non-hidden nodes was already transmitting. Nodes also detected the duration datum in each CTS message and respected a Reserved interval while another node sent its DAT and ACK messages, as discussed above.

The model was run using a prior-art protocol to determine the initial waiting interval and initial contention window. The prior-art protocol included incrementation of delays according to a binary exponential protocol, and performance results were recorded. The model was then run again, but this time using an improved protocol according to the present disclosure. Specifically, in the second run, the initial waiting interval and the initial contention window values were set according to the traffic density, and then were decremented upon each failed transmission attempt, as discussed above. All other parameters were identical in the two runs. The backoff time was limited to a lower limit of 2 slots and an upper limit of 4000 slots. The RTS, CTS, and ACK durations were 25 slots each, and the DAT message was 155 slots, corresponding generally to an 802.11 protocol. The horizontal axis of the chart is the traffic density P, defined as 10 million times the probability that a single node will initiate a new RTS message in any particular slot. P was varied from 100 (very low density) to 10,000 (well into congestion).

The vertical axis is the success rate, equal to the number of completions (that is, complete RTS-CTS-DAT-ACK messages) per 100,000 slots. The hollow data points and dashed line labeled "with Incrementation" correspond to a prior-art protocol in which the initial waiting interval is small (in this case, 2 slots) and is doubled upon each failed transmission attempt (binary exponential delays). The solid line and solid data points labeled "with Decrementation" correspond to a simulated embodiment of the improved protocols disclosed herein, in which the initial waiting interval and initial contention window are set to values related to the wireless traffic density as shown in a subsequent chart, and are then decreased (decremented) by a decrementation value (30 slots for the data shown) upon each failed transmission attempt. In this simulation, the waiting interval and the contention window were set equal to each other, however in further optimization the two parameters may be adjusted separately.

The simulation results show that, at low traffic density, the Incrementation and Decrementation protocols provided nearly identical success rates. This may be expected, since collisions and interference and backoff delays are uncommon at low traffic density. In a mid-region of about P=800 to P=4000, corresponding to a medium traffic density, the Decrementation protocol provided about 10% higher success rates than the prior-art Incrementation protocol. This was due primarily to the numerous short-term re-transmission attempts characteristic of the Incrementation protocols, particularly those based on binary exponential delays, which the Decrementation protocols avoided. At high traffic density, P>4000, both protocols appear in the chart to again provide the same results, however this is illusory. Most of the success rates of the prior-art Incrementation protocol at high density were actually due to just a few of the nodes submitting most of the messages, while the remaining nodes got few to none of the transmission opportunities. This effect is shown in more detail in FIG. 24.

Figure 21:
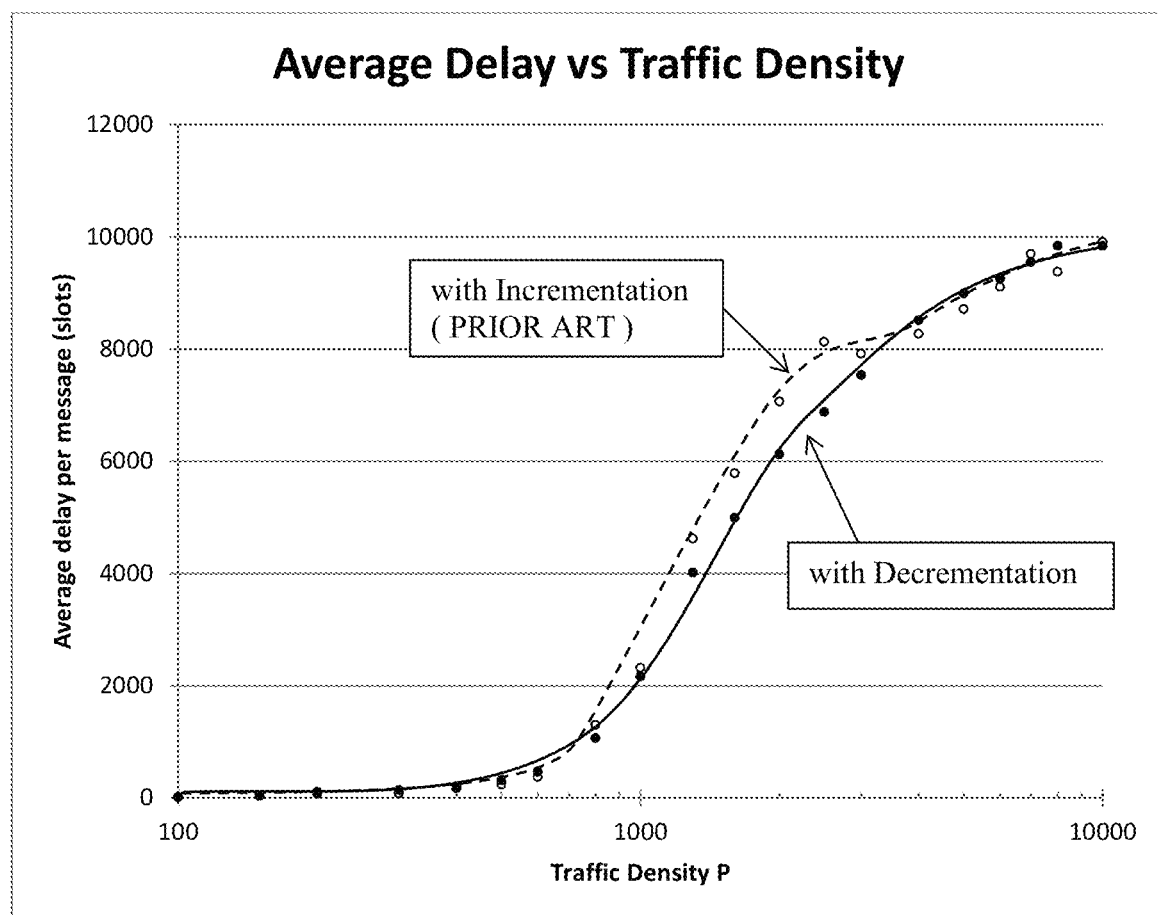
FIG. 21 is a chart comparing simulated delays for a prior-art system versus an exemplary wireless system, according to some embodiments.

FIG. 21 is a chart showing the results of the simulation of FIG. 20, now showing the average delay time per successful completion, as a function of the wireless traffic density P. The Incrementation and Decrementation protocol results are plotted as before, with the hollow points and dashed curve corresponding to the prior-art Incrementation protocol, while the solid curve and solid points correspond to the Decrementation protocol.

At low traffic density, the two protocols have nearly the same low average delays, as expected. In the middle range of P about 800 to 4000, the prior-art Incrementation protocol results in about 10% higher average delays, due primarily to the extra backoff delays from repeated futile RTS requests characteristic of binary exponential delays. At high density, the two protocols appear to have the same average delays, but this too is an illusion. As demonstrated in FIG. 26, the delays at high traffic are not distributed equally among the nodes by the prior-art Incrementation protocol, but are endured primarily by a fraction of the nodes while the remaining nodes are permitted to transmit with almost no delays.

Figure 22:
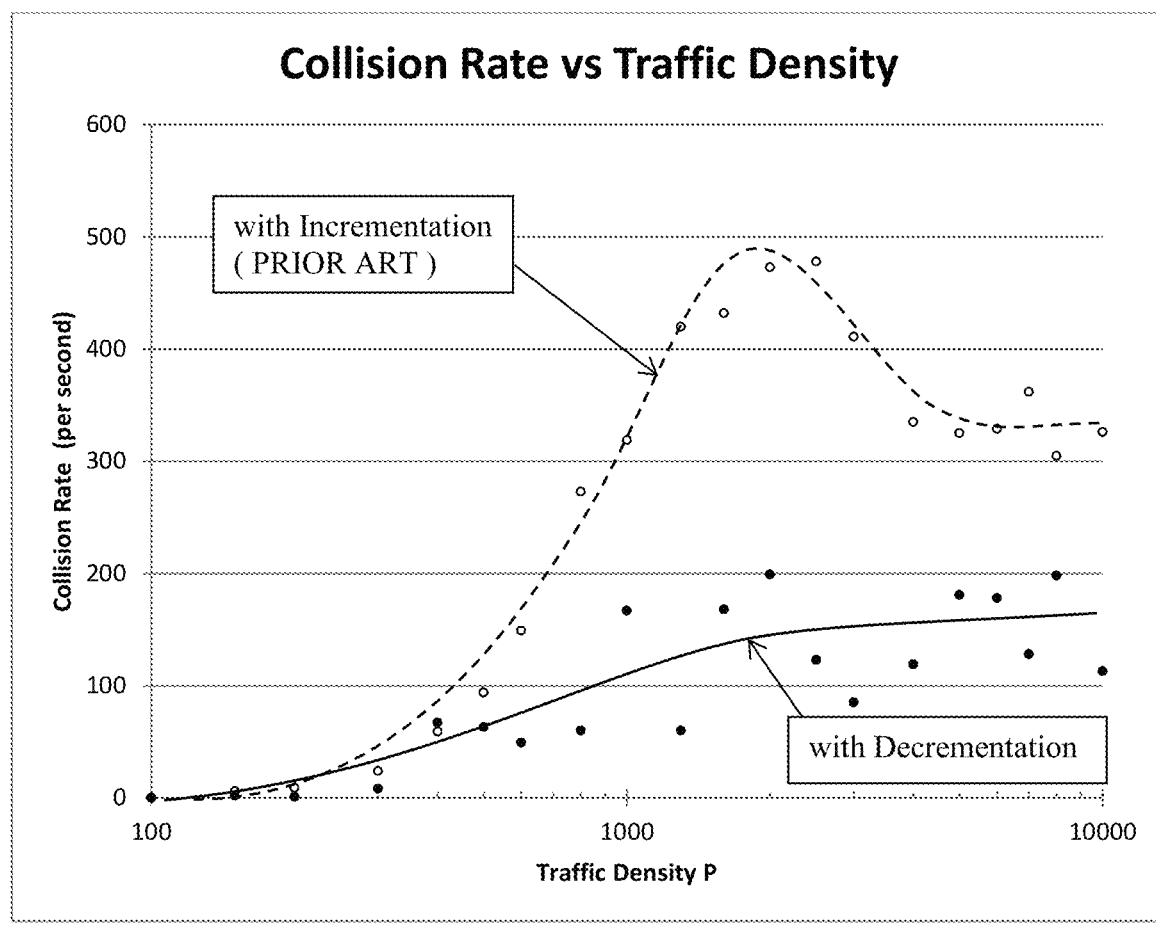
FIG. 22 is a chart comparing the simulated collision rate for a prior-art system versus an exemplary wireless system, according to some embodiments.

FIG. 22 is a chart showing the simulated collision rate versus traffic density, for the prior-art Incrementation protocol and for the Decrementation protocol. As before, the dashed line and hollow points represent the prior-art Incrementation results and the solid line and solid points represent the Decrementation results. The collision rate is the number of wireless collisions per 100,000 slots, which corresponds to one second with a 10-microsecond slot width. The Incrementation protocol generates three times as many collisions as the Decrementation protocol in the mid-range, due primarily to the accidental overlap of simultaneous RTS messages which are generated abundantly with short delay times in the Incrementation scheme, but not with the new Decrementation protocol as shown.

Figure 23:
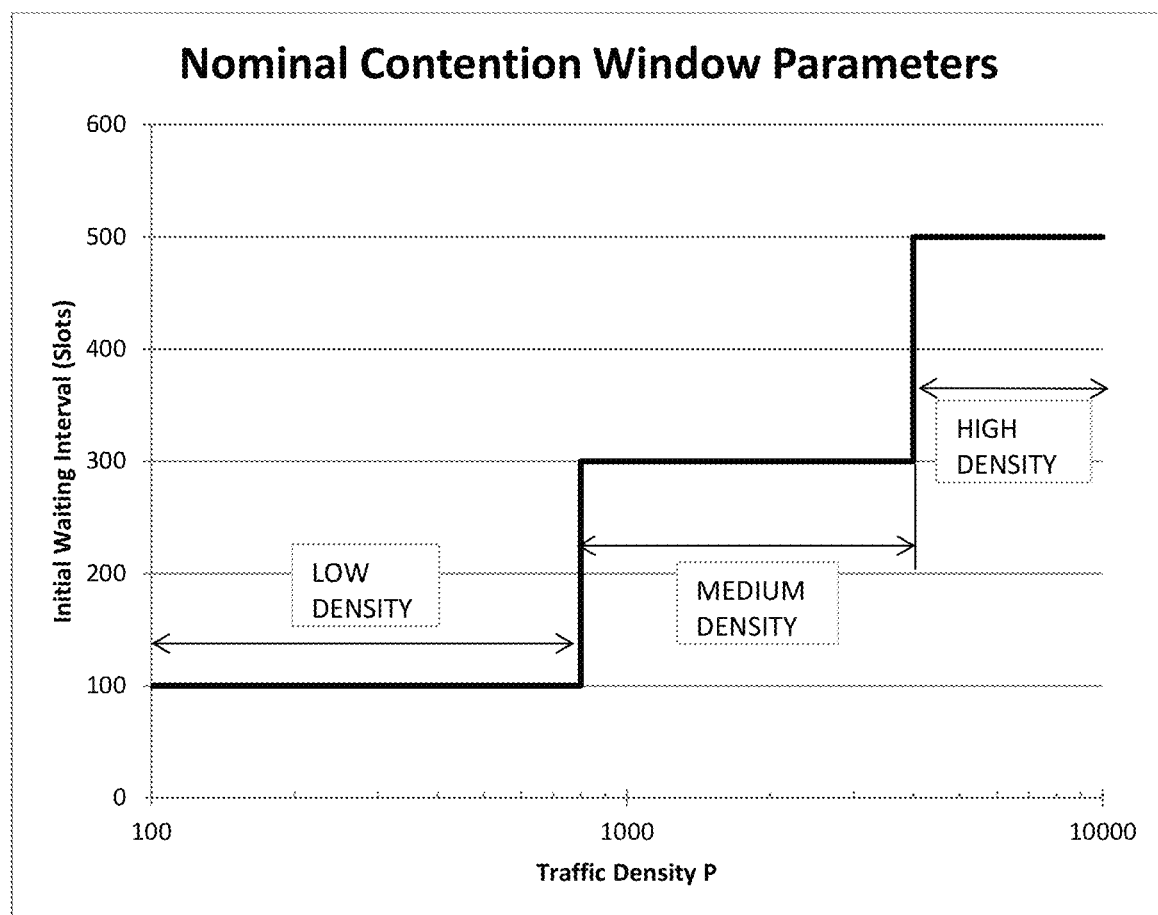
FIG. 23 is a chart showing how the initial waiting interval may be adjusted, according to some embodiments.

FIG. 23 is a chart showing exemplary settings of the initial waiting time and/or the initial contention window parameters as a function of the traffic density for an exemplary Decrementation protocol, according to some embodiments. The chart shows three settings, adjusted for low, medium, and high traffic density conditions. For example, the initial waiting interval and initial contention window may be set at 100 slots for traffic densities of P below 800, and at 300 slots for the mid-range P between 800 and 4000, and at 500 slots for the high range of P above 4000.

Viewed differently, the waiting interval and/or contention window may be set according to a channel-occupation time per successful completion, or Tocc, which is equal to the sum of the CTS, DAT, and ACK message durations. The RTS is not included in Tocc because backoff delays are not initiated until after the RTS is finished. Thus, Tocc represents the amount of time (in slots) that the node plans to occupy the channel to complete its message sequence. For the conditions of the simulation, Tocc=205 slots. With these parameters, the initial waiting interval and/or the initial contention window values shown in the figure correspond closely to 0.5*Tocc for low-density conditions, 1.5*Tocc for medium-density conditions, and 2.5*Tocc for high-density conditions. Practitioners may calculate Tocc for their particular wireless LAN systems and employ these ratios as a starting point for setting the initial waiting interval and the initial contention window values. Practitioners may adjust or optimize the initial waiting interval and/or the initial contention window, as well as other parameters such as the decrementation values for those two intervals, the upper and lower limits for those two intervals, and other protocol parameters, by varying each parameter and monitoring the resulting changes in the throughput, success rate, collision rate, average delay, or other LAN parameter.

In other embodiments, the initial waiting time and/or the initial contention window and/or other parameters may be adjusted according to a formula that takes as inputs measured LAN performance values such as the traffic density, the completion rate, the average delay, or other performance value. For example, the initial waiting interval and/or the initial contention window may be set proportional to the traffic density. As another example, the initial waiting interval and/or the initial contention window may be set according to a model, such as a computer model or formula, configured to optimize one or more LAN performance values, such as minimizing the average delay or maximizing the message success rate at the current traffic density. In addition, the formula may take, as input, measured LAN performance values such as the distribution of message durations in the current traffic (that is, whether most messages are long or short), and/or the distribution of activity of the various nodes (that is, whether a few nodes are contributing most of the traffic or whether most of the nodes are participating about equally), and may adjust the initial waiting interval and/or the initial contention window accordingly. Practitioners may devise further means for adjusting the various delay parameters (such as the initial contention window, initial waiting interval, decrementation values for each, upper and lower limits for each, and the like) based on further LAN performance metrics.

Figure 24:
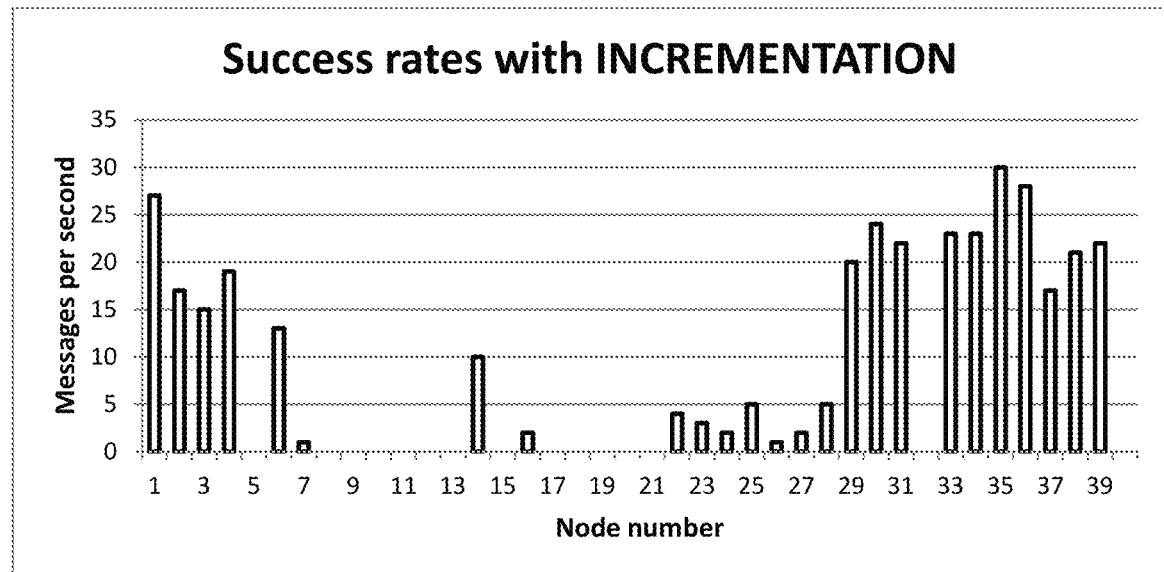
FIG. 24 is a chart showing non-uniform success rates among the nodes of a simulated prior-art system.

FIG. 24 is a chart showing the message success rates for individual nodes of the simulated LAN, using the prior-art Incrementation protocol, with a wireless traffic density of P=4000. A message success, or completion, occurred whenever a node managed to transmit a complete RTS-CTS-DAT-ACK sequence without interference. This chart demonstrates the blocked-node problem with prior-art protocols. The chart shows that, with the prior-art Incrementation protocol, most of the successful message completions were obtained by just one-third of the nodes, while the rest of the nodes were "blocked", or received few or none of the transmission opportunities. Incrementation-type protocols tend to distribute the message transmission opportunities unequally at high traffic density, favoring those few nodes that have waited the shortest amount of time, thereby resulting in a few nodes obtaining most of the transmission opportunities while the other nodes are stuck in a perpetually repeating backoff state. This chart also shows why the supposed equality of success rates of the Incrementation and Decrementation protocols at high traffic density, on the right side of FIG. 20, is false; that high success rate for the Incrementation case is actually benefiting just a fraction of the nodes in the LAN. The unlucky users in such a LAN may find the resulting wireless performance to be unacceptable.

Figure 25:
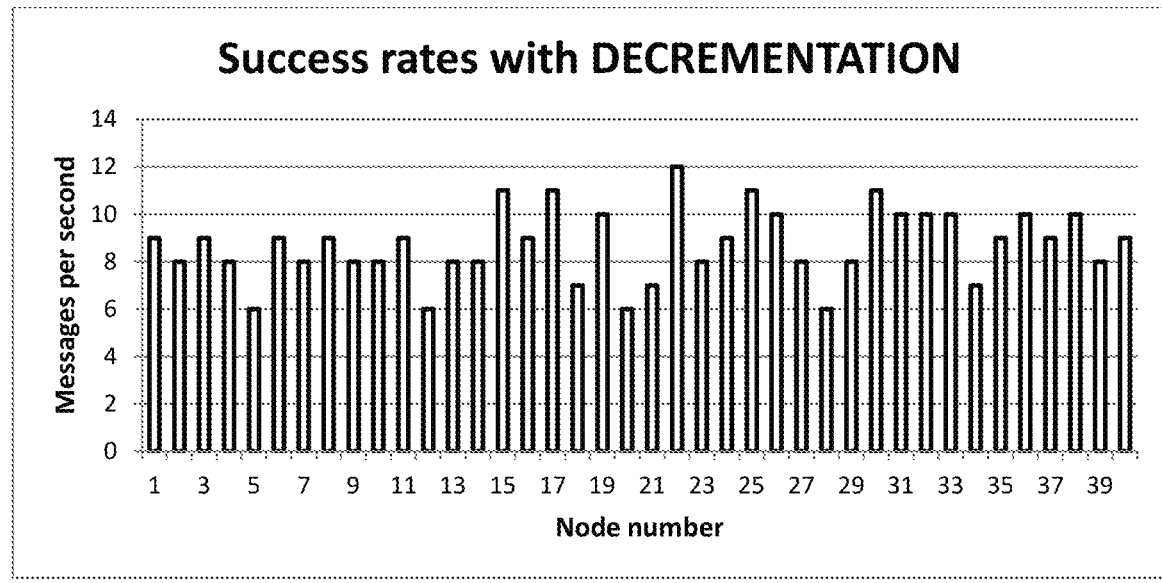
FIG. 25 is a chart showing improved uniformity of success rates among the nodes of an exemplary simulated system, according to some embodiments.

FIG. 25 is a chart showing the message success rate for individual nodes of the simulated LAN, using the Decrementation protocols as disclosed herein, with all conditions other than the Decrementation protocol being the same as for the chart of FIG. 24. Again, the traffic density is at the boundary between medium and high density, at P=4000. With the Decrementation protocol, the success rate is now distributed fairly among the various nodes, with every node having numerous transmission opportunities and roughly equal numbers of successful message completions. The remaining variations among the node results are consistent with statistical fluctuations. Hence, in the embodiment shown, the Decrementation protocol has eliminated the blocked-node problem at high traffic density.

Figure 26:
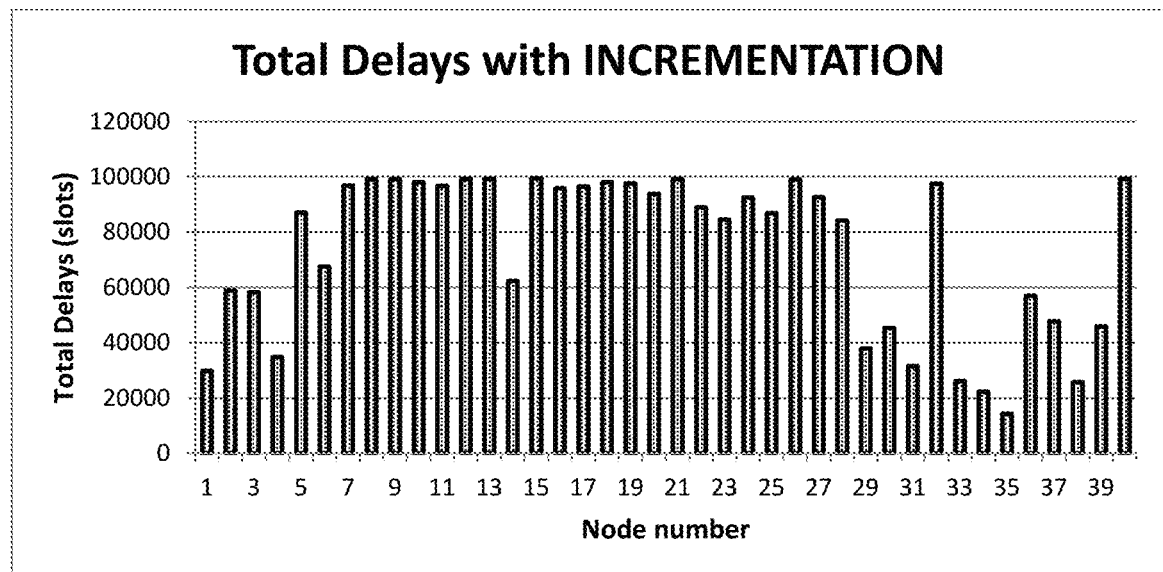
FIG. 26 is a chart showing non-uniform delay distribution among the nodes of a simulated prior-art system.

FIG. 26 is a chart showing the total amount of time (in slots) that each node was in backoff or hold modes, using the simulated LAN with the prior-art Incrementation protocol and P=4000. As the chart shows, most of the delay burden was carried by about 25 of the nodes, while the remaining 15 nodes had far less total delays. This non-uniform distribution of delays is a result of the Incrementation protocol repeatedly imposing longer delays on the nodes that have already waited the longest amount of time, thereby resulting in an intrinsic nonuniformity of opportunity among the nodes. The chart shows that the supposed equality of delays between the Incrementation and Decrementation protocols at high traffic density, as shown on the right side of FIG. 21, is actually a result of a manifestly unequal distribution of delays among the nodes, for the prior-art Incrementation case. Most users in such a LAN are likely to be frustrated by such extended delays, particularly while their neighbor nodes are able to complete messages with little or no delays.

Figure 27:
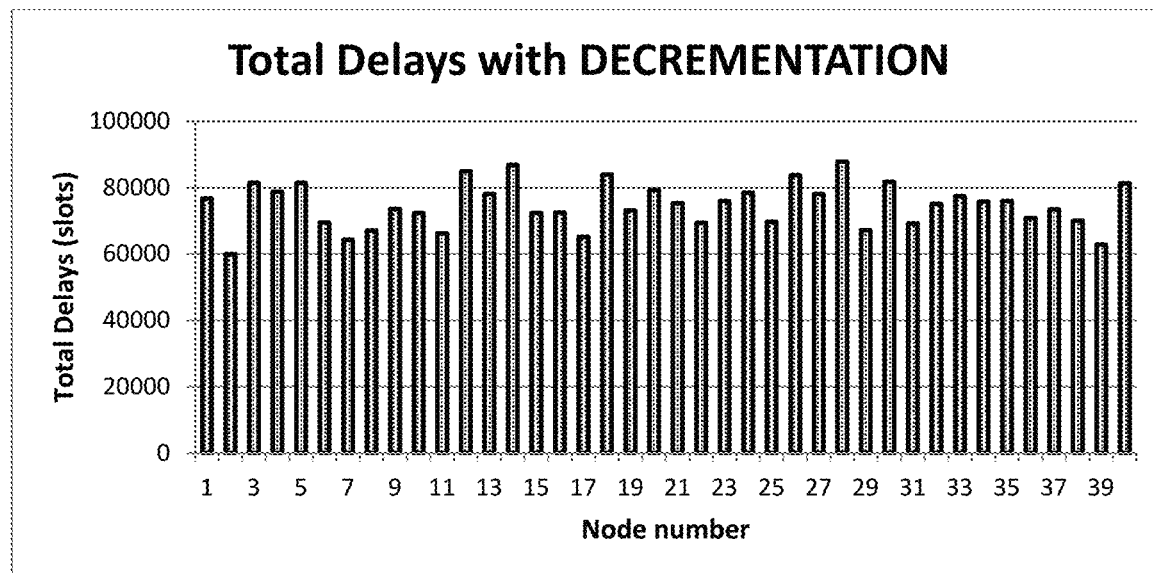
FIG. 27 is a chart showing improved uniformity of delays among the nodes of an exemplary simulated system, according to some embodiments.

FIG. 27 is a chart showing the total amount of time (in slots) that each node was in backoff or hold modes, using a simulated LAN with the Decrementation protocol, but otherwise the same conditions as for FIG. 26. The chart shows that the delays are distributed nearly uniformly among the various nodes, thus representing far greater fairness and uniformity with the Decrementation protocol than the Incrementation protocol. The demonstrated improvement in equality, with the Decrementation protocol embodiment, is a result of each node gaining a competitive advantage, relative to the other nodes, upon each backoff delay. The results presented in FIGS. 24-27 thereby demonstrate that the prior-art Incrementation-type protocols generally result in substantial unfairness and nonuniformity of communication opportunities at high traffic densities, whereas an embodiment of the Decrementation protocols disclosed herein can provide high levels of fairness and equality under the same traffic assumptions. Practitioners analyzing the service quality of their LAN may beneficially test the fairness and uniformity parameters among the LAN nodes under high traffic density conditions. If the completion successes are mainly enjoyed by a portion of the nodes, while much longer delays are borne by other nodes, practitioners may consider switching to one of the Decrementation protocols disclosed herein for substantially improved overall performance.

In many wireless networks, messages may be prioritized according to the quality of serviced demanded, so that voice data has a higher priority than emails for example. The systems and methods disclosed herein may be applied to each priority class, so that high-priority messages may be served ahead of lower-priority messages when necessary to provide sufficient quality of service. QoS weighting can be provided even when the lower-priority messages have already experienced multiple failed attempts, by appropriately adjusting the waiting interval and/or contention window settings, thereby providing that, even in the heaviest traffic loads, the lowest priority messages can still be accommodated eventually. Each of the above considerations can be managed by adjusting the initial waiting interval and/or the initial contention window values, and possibly the decrementation values and/or the upper and lower limits for each delay, based on message priority, according to embodiments disclosed. For example, a high priority message may have a shorter initial waiting interval and/or a shorter initial contention window than a low priority message. Additionally, the decrementation value(s) may be made larger for high priority messages than for low priority messages. As a further option, the maximum waiting interval and/or contention window limits may be made shorter for high-QoS messages and longer for low-QoS messages, thereby providing prompt service to the high priority messages while still accommodating the low-priority messages in due course. With proper adjustment of the initial waiting interval and/or initial contention window values, and optionally their decrementation values and upper and lower limits (or other delay parameters), a continuing advantage may be provided to the high priority messages without entirely blocking the lower priority messages, even under heavy load conditions.

The systems and methods disclosed herein can provide numerous advantages not obtainable with prior-art wireless protocols. Embodiments can improve fairness and uniformity in channel access by providing a competitive advantage to nodes that have endured multiple failed transmission attempts, eliminating the blocked-node problem, according to some embodiments. In addition, the initial waiting interval and/or initial contention window values represent adjustable degrees of freedom which are not available to conventional protocols. Practitioners may vary and optimize these parameters based on LAN performance metrics, and thereby provide further performance optimization. With proper adjustment based on wireless traffic density (and optionally on message priority), these degrees of freedom can provide higher throughput than obtainable using conventional protocols, as demonstrated in the charts above.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file—storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

Embodiments of systems and methods according to present principles can provide high throughput, low message collision rates, and reduced delays in wireless communication. Protocols according to present principles can be beneficially applied to numerous applications, including but not limited to vehicles (e.g., roadway, airborne, waterborne, autonomous, semi-autonomous, human-driven, rental scooters, truck trackers, etc.), personal devices (e.g., mobile phones, health monitors, personal locators, pet locators, etc.), computers (e.g., tablet, laptop, desktop, server, embedded, single-chip, portable, fixed-site, etc.), interconnected devices (e.g., "smart" appliances and controls, entertainment devices, voice-activated assistants, home security systems, etc.), emergency call and response systems (e.g., 911 servers, law enforcement systems, fire response systems, health emergency systems, national defense systems, etc.), responsive monitors and alarms (e.g., intrusion monitors, fire or smoke alarms, weather and other environmental, highway traffic, pedestrian traffic, earthquake monitors, etc.) and innumerable other products that communicate using radio waves. The practicality and usefulness of embodiments according to present principles will become greatly augmented with the widespread adoption of 5G and subsequent wireless generations (such as 6G and following subsequent and future technologies), further driving congestion in the limited bandwidth available.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

What is claimed is:

1. A system for wireless communication, comprising:
a transmitter configured to transmit wireless messages;
a receiver configured to receive wireless messages;
a processor operably connected to the transmitter and the receiver; and
non-transient computer-readable media operably connected to the processor, containing instructions for causing the processor to perform a method comprising:
transmitting a wireless message while no interfering signals are detected;
then, if a confirmatory reply is not received within a predetermined interval, waiting a time period equal to the sum of a predetermined initial waiting interval plus a randomly selected delay within a predetermined initial contention window and then re-transmitting the wireless message;
then, if a confirmatory reply to the re-transmitted message is not received within a predetermined interval, waiting a predetermined second waiting interval plus a randomly selected delay within a predetermined second contention window, wherein the second waiting interval is shorter than the initial waiting interval, or the second contention window is shorter than the initial contention window; and
then, transmitting the wireless message.

2. The system of claim 1, wherein the non-transitory computer-readable media further comprise instructions for causing the processor to perform the steps of:
transmitting a DAT wireless message;
receiving an ACK wireless message confirming that the DAT wireless message was received;
preparing to transmit an additional RTS wireless message;
waiting a backoff delay comprising a waiting interval equal to the initial waiting interval plus a randomly selected portion of a contention window equal to the initial contention window; and
then transmitting the additional RTS message;
whereby the waiting interval and the contention window are reset to their respective initial values after each successful RTS-CTS-DAT-ACK completion, such that a waiting interval or a contention window continues to be decremented for successive iterations as long as any step of the RTS-CTS-DAT-ACK process fails, and when it succeeds, the waiting interval and the contention window are reset to their respective initial values.

3. The system of claim 1, wherein the instructions further include instructions for determining that a wireless message was successfully transmitted by receiving a confirmatory reply comprising a CTS message or an ACK message during a predetermined interval, and further include instructions for determining that the wireless message was not successfully transmitted by failing to receive the confirmatory reply comprising a CTS message or an ACK message during the predetermined interval.

4. The system of claim 1, wherein the first contention window is substantially equal to the first waiting interval and the second contention window is substantially equal to the second waiting interval, wherein the term substantially equal corresponds to within plus or minus X percent of each other, wherein X is selected from the group consisting of: 15%, 10%, 5%, 2%, and 1%.

5. The system of claim 1, wherein the instructions further include determining a wireless traffic density or collision rate, and adjusting the initial waiting interval according to the wireless traffic density or collision rate.

6. The system of claim 1, wherein the instructions further include measuring a transmission failure rate and adjusting the initial waiting interval according to the transmission failure rate.

7. The system of claim 1, wherein the instructions further include receiving a message that indicates a wireless traffic density, and adjusting the initial waiting interval according to the indicated wireless traffic density.

8. The system of claim 1, wherein the instructions further include receiving a message that includes a particular value, and setting the initial waiting interval equal to the particular value.

9. The system of claim 1, wherein the wireless message is transmitted according to 5G or higher technology.

10. The system of claim 1, wherein the instructions further include:
causing the second waiting interval to be shorter than the initial waiting interval by a predetermined decrementation amount; and
causing the third waiting interval to be shorter than the second waiting interval by the same predetermined decrementation amount.

11. The system of claim 1, wherein the instructions further include:
multiplying the initial waiting interval or the initial contention window by a predetermined factor less than 1; and
multiplying the second waiting interval or the second contention window by the same predetermined factor.

12. The system of claim 1, wherein the instructions further include:
storing, in memory, a number of backoff delays;
calculating a waiting interval equal to the initial waiting interval minus a product of a waiting interval decrementation value times the number of backoff delays, or calculating a contention window equal to the initial contention window minus a product of a contention window decrementation value times the number of backoff delays;
after each backoff delay comprising a waiting interval plus a randomly selected portion of a contention window, incrementing the number of backoff delays; and
after receiving an ACK message, setting the number of backoff delays to zero.

13. The system of claim 1, wherein the processor includes a digital clock configured to count clock cycles during the initial waiting interval while the receiver detects no interfering signal, and to suspend counting clock cycles while the receiver detects an interfering signal.

14. The system of claim 1, wherein the non-transitory computer readable media include a predetermined lower waiting interval limit, and the processor is configured to adjust each successive waiting interval to a value no lower than the predetermined lower waiting interval limit.

15. The system of claim 1, wherein the processor is configured to determine, upon detecting the confirmatory reply during the predetermined interval, that the message was successfully received, and further configured to determine, upon failing to detect the confirmatory reply during the predetermined interval, that the message was not successfully received.

16. A method for wireless communication, comprising:
transmitting a first wireless message;
then, determining that the first wireless message was not successfully received;

then, waiting a first backoff delay comprising an initial waiting interval plus a randomly selected portion of an initial contention window;

then, transmitting a second wireless message;

then, determining that the second wireless message was not successfully received;

then, waiting a second backoff delay comprising a second waiting interval plus a randomly selected portion of a second contention window, wherein the second waiting interval is shorter than the first waiting interval or the second contention window is shorter than the second contention window; and then, transmitting a third wireless message.

17. The method of claim 16, wherein the second waiting interval is shorter than the first waiting interval by a predetermined decrementation value.

18. The method of claim 16, wherein the first contention window is substantially equal to the first waiting interval, and the second contention window is substantially equal to the second waiting interval.

19. The method of claim 16, wherein the transmitting of the first, second, and third wireless messages includes 5G technology.

20. The method of claim 16, further comprising:

determining that a fourth wireless message has been successfully received;

transmitting, responsive to determining that the fourth wireless message has been successfully received, a fifth wireless message and determining that the fifth wireless message was not successfully received within a predetermined interval;

then, waiting for a fifth backoff delay comprising a waiting interval equal to the initial waiting interval, plus a randomly selected portion of a contention window equal to the initial contention window; and then, transmitting a sixth wireless message.

21. The method of claim 16, further comprising adjusting the initial waiting interval based at least in part on a wireless traffic density or a transmission failure rate.

22. The method of claim 21, further comprising:

when the wireless traffic density is below a predetermined first value, adjusting the initial waiting interval to a first predetermined setting;

when the wireless traffic density is above the first value and below a predetermined second value, adjusting the initial waiting interval to a second predetermined setting; and when the wireless traffic density is above the second value, adjusting the initial waiting interval to a third predetermined setting.

23. The method of claim 22, wherein the first setting is lower than the second setting, and the second setting is lower than the third setting.

24. The method of claim 16, further comprising optimizing the initial waiting interval by:

measuring a wireless message success rate;

then, varying the initial waiting interval; and then, determining whether the wireless message success rate has increased or decreased.

25. A local area network, comprising:

a plurality of nodes, each node comprising a processor, a transmitter, and a receiver; and a base station comprising a processor, a transmitter, and a receiver; wherein:

each node is configured to transmit an RTS message to the base station;

the base station is configured to transmit a CTS message responsive to the RTS message;

each node is configured to transmit a DAT message responsive to the CTS message;

the base station is configured to transmit an ACK message responsive to the DAT message;

each node is configured to wait, after transmitting an RTS message and failing to receive a CTS message during a predetermined interval, an initial waiting interval plus a randomly selected portion of an initial contention window, and then to transmit the RTS message a second time;

each node is configured to wait, after failing to receive a CTS message during a predetermined interval following the second transmitted RTS message, a second waiting interval plus a randomly selected portion of a second contention window, and then to transmit the RTS message a third time;

wherein the second waiting interval is shorter than the initial waiting interval, or the second contention window is shorter than the initial contention window.

26. The local area network of claim 25, wherein:

each node is configured to wait, after transmitting a DAT message and failing to receive an ACK message within a predetermined interval, a fourth waiting interval plus a randomly selected portion of a fourth contention window, and then to transmit the RTS message a fourth time;

each node is configured to wait, after failing to receive a CTS message during a predetermined interval following the fourth transmitted RTS message, a fifth waiting interval plus a randomly selected portion of a fifth contention window; and then, to transmit the RTS message a fifth time;

wherein the fifth waiting interval is shorter than the fourth waiting interval, or the fifth contention window is shorter than the fourth contention window.

27. The local area network of claim 25, wherein each node is configured to include, in each RTS message, a first duration value, wherein the first duration value indicates a duration of the DAT message, or wherein the first duration value indicates a sum of a duration of the DAT message plus a duration of the ACK message.

28. The local area network of claim 27, wherein the base station is configured to transmit, in a CTS message, a second duration value, wherein the second duration value is the duration of the DAT message, or the second duration value is a sum of the duration of the DAT message plus the duration of the ACK message.

29. The local area network of claim 28, wherein each node is configured to withhold transmitting all messages for a time indicated by the second duration value.

30. The local area network of claim 29, wherein the base station is further configured to determine, following the transmitting of the CTS message, whether a DAT message is present or absent during a predetermined interval, and to transmit, after determining that the DAT message is absent, a beacon message indicating that the nodes may then transmit messages.

* * * * *